US012717639B2

(12) United States Patent
Sun et al.

(10) Patent No.: US 12,717,639 B2
(45) Date of Patent: Aug. 25, 2026

(54) STACKING STACK TECHNIQUE FOR OPERATING SYSTEM KERNELS TO SUPPORT PRIORITIZED AND PREEMPTIBLE TASKLETS

(71) Applicants: Eric Sun, Acton, MA (US); Naxin Sun, Acton, MA (US)

(72) Inventors: Eric Sun, Acton, MA (US); Naxin Sun, Acton, MA (US)

(73) Assignee: Naxin Sun, MA (US)

( * ) Notice: Subject to any disclaimer, the term of this patent is extended or adjusted under 35 U.S.C. 154(b) by 678 days.

(21) Appl. No.: 18/205,294

(22) Filed: Jun. 2, 2023

(65) Prior Publication Data

US 2024/0403128 A1 Dec. 5, 2024

(51) Int. Cl.

*G06F 9/46* (2006.01)
*G06F 9/48* (2006.01)
*G06F 9/50* (2006.01)
*G06F 12/02* (2006.01)

(52) U.S. Cl.

CPC .............. *G06F 9/505* (2013.01); *G06F 9/485* (2013.01); *G06F 12/023* (2013.01); *G06F 2212/1041* (2013.01)

(58) Field of Classification Search

CPC ........ G06F 9/505; G06F 9/485; G06F 12/023; G06F 2212/1041

See application file for complete search history.

*Primary Examiner* — Gregory A Kessler

(57) ABSTRACT

Described is improved resource utilization for multithreading. A first run-time stack is constructed for a first tasklet by allocating a contiguous block of memory between starting and ending memory addresses in a stack pool. The first tasklet executes using a first portion of the contiguous block of memory, up to an intermediate memory address, prior to being preempted by a second tasklet. A second run-time stack is constructed in the stack pool by allocating a second starting memory address, before the ending memory address of the first run-time stack. The second tasklet executes from the second starting memory address, without overlapping the first portion of memory used to execute the first tasklet prior to preemption. Memory addresses associated with the second run-time stack are freed after the second tasklet terminates. Execution of the first tasklet resumes, using memory addresses previously associated with the first run-time stack prior to being preempted.

20 Claims, 8 Drawing Sheets

600

610a
time=$t_1$
Higher Address
Free
Kernel Stack
MSP

610b
Higher Address
Stack A
Free
Process Stack
605
PSP 620a
time=$t_2$
Higher Address
Free
Kernel Stack
606
608
MSP 620b
Higher Address
Stack A
Free
Process Stack
PSP 630a
time=$t_3$
Higher Address
Free
Kernel Stack
607
MSP 630b
Higher Address
Stack A
Stack B
Free
Process Stack
PSP
609

640a
time=$t_4$
Higher Address
Free
Kernel Stack
MSP

640b
Higher Address
Stack A
Stack B
Free
Process Stack
PSP 650a
time=$t_5$
Higher Address
Free
Kernel Stack
MSP 650b
Higher Address
Stack A
Stack B
Free
Process Stack
655
PSP

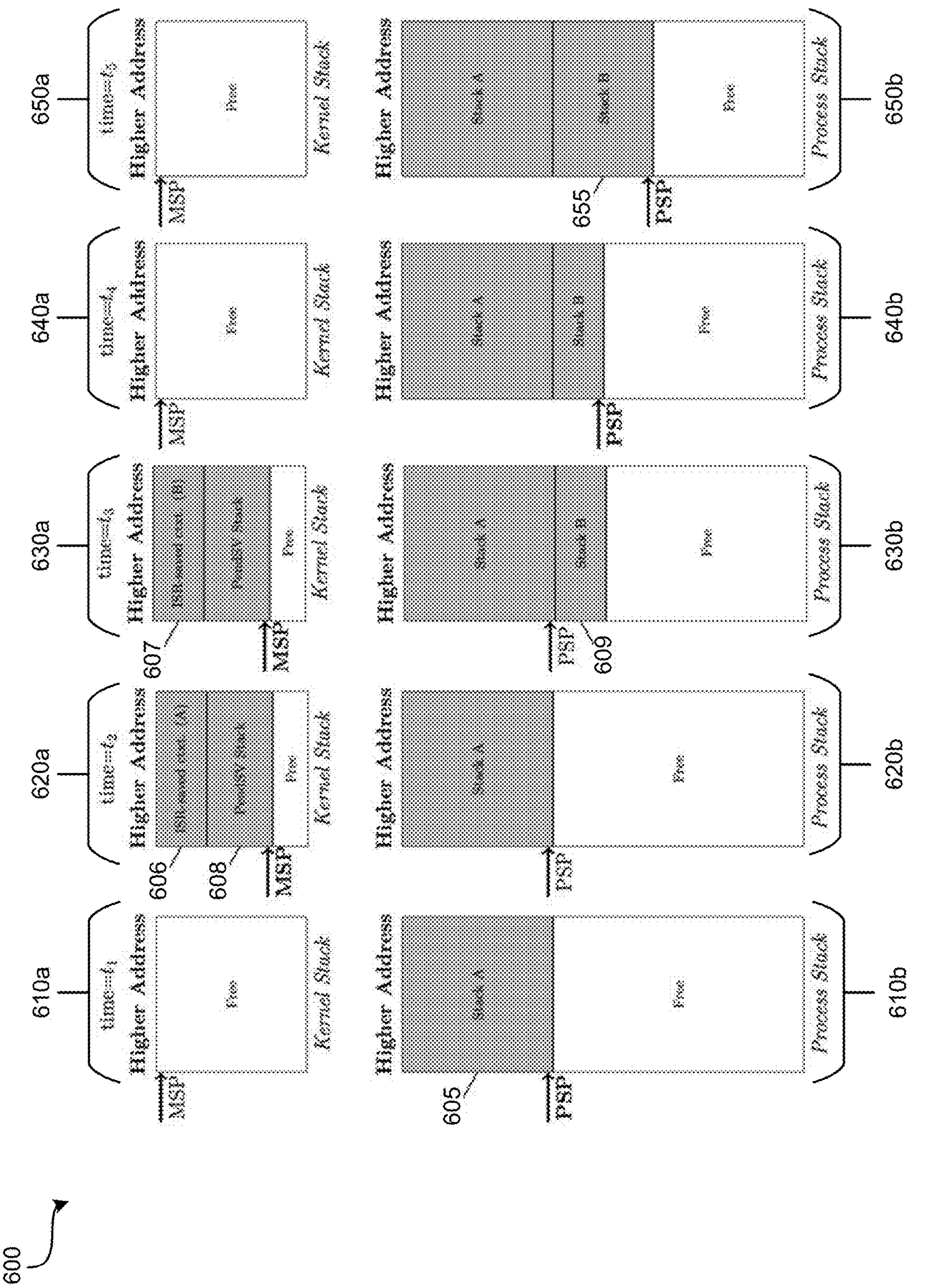

FIG. 6

700a
712a
714a
716a
718a
722
732
742
775a
Higher Address
Lower Address
PSP
700b
712b
714b
716b
718b
722
732
752
775b
Higher Address
Lower Address
PSP
700c
712c
714c
716c
718c
722
734
775c
Higher Address
Lower Address
PSP

STACKING STACK TECHNIQUE FOR OPERATING SYSTEM KERNELS TO SUPPORT PRIORITIZED AND PREEMPTIBLE TASKLETS

FIELD OF THE DISCLOSURE

The present disclosure generally relates to operating system kernels and thread management. For example, aspects of the present disclosure relate to prioritized and preemptible tasklet threads that can be used with real-time demanding and/or embedded systems.

BACKGROUND OF THE DISCLOSURE

An operating system (OS) is system software that manages the hardware and software resources of a computing device. For example, an OS acts as an intermediary between computer hardware and application software by abstracting hardware-specific details and providing common system services. The kernel is the central program of the OS that controls system resources and interfaces most directly with hardware.

A common service provided by an OS (e.g., provided by a kernel implementation associated with an OS) is multi-threading. Multithreading enables multiple threads to run concurrently and independently from each other while sharing resources. The multiple threads can also be referred to as independent subprograms. For an OS that services multi-threading, the kernel can implement a scheduler to manage the scheduling of each thread (e.g., selecting a next thread to schedule and receive processor time and/or an allocation of other resources, etc.)

Multithreading can be used to improve the efficiency of computational tasks. For example, multithreading can be used to break a complex application software into multiple subprograms, some (or all) of which may run be independent from one another. In one example, a multithreading computing device may be simultaneously responsible for communicating with external devices, responding to user input, and performing mathematical calculations. Since such jobs are unrelated, it may be desirable to run them concurrently. The scheduler may switch between executing different jobs, enabling a single-core architecture to service a plurality of jobs with the illusion of parallelism. In some cases, a user may interface with a multithreading service using a subroutine (e.g., callback function) that will be called when the job executes.

It can be difficult and/or challenging to properly support multithreading implementations in kernel space programming. For instance, from a system (e.g., OS or kernel) perspective, implementing multithreading requires proper resource allocation, assignment, and/or management for each thread of a plurality of threads that exist at any given moment in the multithreading environment. There is a need for systems and techniques that can be used provide more efficient resource management and utilization for multi-threading implementations.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media (referred to herein as "system and techniques") for improved resource utilization for multi-threading implementations on computing devices. For example, the systems and techniques can be used to improve the efficiency of Random Access Memory (RAM) utilization associated with multi-thread creation and management. In one illustrative example, the systems and techniques can be used to improve the efficiency of RAM utilization of a multithreading implementation associated with real-time demanding, embedded systems, and/or a real-time operating system (RTOS), as will be described in greater depth below.

In some embodiments, the systems and techniques described herein can be used to implement a real-time preemptive kernel. In some embodiments, the presently disclosed real-time preemptive kernel can be used to provide improved RAM utilization for multithreading operations of a resource-constrained computing device or platform, without sacrificing or otherwise degrading the performance thereof. For instance, examples of a resource-contained computing device or platform can include, but are not limited to, a computing device implementing a RTOS, embedded systems, etc.

As used herein, the terms "thread" and "job" may be used interchangeably to refer to a subprogram (e.g., subprogram instance) that is capable of being scheduled independently from other subprogram instances. It is noted that in some cases, such as within the field of real-time operating systems, the term "thread" is used synonymously and interchangeably with "task." In one illustrative example, the term "job" is used to refer to an abstract subprogram that can be independently scheduled from other jobs. A job can be designed using a persistent style (e.g., tasks) or using a run-to-completion style (e.g., tasklets). In other words, a run-to-completion job can be referred to herein as a "tasklet." A run-to-completion job can be the same as a "run-to-completion thread," both of which can be referred to as "tasklets." The terms "run-to-completion" and "run-to-termination" are used interchangeably herein. In some aspects, tasklets correspond to fire-once event handlers, whereas tasks correspond to persistent threads that run a forever loop that may become blocked or yield to allow other jobs (e.g., threads) to execute.

As described herein, reference is made to examples based on a real-time operating system (RTOS) implementation of aspects of the present disclosure. However, it is noted that this is done for purposes of clarity of illustration and example, and is not intended to be construed as limiting—it is appreciated that the systems and techniques described herein can be implemented in various computing environments, platforms, devices, etc., including, and in addition to, an RTOS, without departing from the scope of the present disclosure.

Aspects of the present disclosure can be used to enable a scheduler to efficiently allocate and free tasklet stack memory, reducing the system's memory footprint compared to a conventional system. For instance, a conventional operating system with kernel-based preemption can allocate a unique and persistent stack to each constructed task. In at least some cases and implementations, the approach of persistent stack allocation may result in the underutilization of memory, for example such as when a task uses less memory than was assigned or allocated to the task.

In at least some cases or examples, memory underutilization may occur based on the presence or occurrence of gaps between assigned blocks of memory addresses corresponding to tasks, such that allocated memory is interspersed by free memory (e.g., adjacent blocks of memory addresses corresponding to two different tasks are separated by one or more free memory addresses). In other words, one or more unused memory addresses may be present between the different memory allocations made for each task. In at least some aspects, the systems and techniques described herein can be used to eliminate these two sources of memory overhead that may be commonly associated with various job stacks, thereby improving the efficiency of resource utilization (e.g., RAM or memory utilization, etc.) associated with task scheduling (e.g., thread scheduling) and/or multithreading implementations.

In some embodiments, the systems and techniques described herein can be used to service context switching between user-specified independent subprograms (e.g., tasklets), wherein the tasklets may preempt one another based upon a respective priority value associated with each tasklet. In some embodiments, each job (e.g., tasklet) may have an associated job control block (JCB) used to store job-specific metadata such as priority, resources held, program counter, and/or general purpose-registers relating to the job's context, etc.

In some embodiments, a plurality of tasklets may utilize at least one contiguous block of memory referred to as a "tasklet stack memory pool" or "stack pool." In some aspects, the term "tasklet stack memory pool" may be used interchangeably with the term "tasklet stack space memory pool." A tasklet stack can also be referred to as a tasklet "stack space." Each tasklet of the plurality of tasklets can be constructed based on allocating a corresponding block of memory between a starting memory address and an ending memory address in the stack pool. In some aspects, each tasklet can be allocated a contiguous block of memory within the stack pool. The block of memory allocated to a particular tasklet can be referred to as the individual stack of the tasklet (e.g., the run-time stack space of the tasklet)—in other words, the stack pool can comprise a plurality of individual stacks, each corresponding to a different tasklet. In some aspects, a single tasklet accesses the stack pool at a given time (e.g., a single tasklet accesses the stack pool and executes using its corresponding stack memory allocated within the stack pool), but it is again noted that a plurality of tasklets may use the stack pool (e.g., be allocated memory addresses within the stack pool).

In some examples, allocation of stack space from the tasklet stack space memory pool can be performed based on (e.g., following or using) a direction of stack growth (also referred to as a "stack growing direction" or a "stack direction"). For example, the allocation of stack space from the tasklet stack space memory pool can be performed from "higher" memory addresses to "lower" memory addresses (e.g., stack growing to lower memory addresses) and/or can be performed from lower memory addresses to higher memory addresses (e.g., stack growing to higher memory addresses). In some examples, the direction of stack growth can be based at least in part on a CPU architecture used to implement or otherwise associated with the stack. For instance, some CPU architectures (and/or other hardware components associated with a given implementation) may support only a higher-to-lower direction of stack growth, while other CPU architectures (and/or hardware components associated with other given implementations) may support only a lower-to-higher direction of stack growth. In some embodiments, the systems and techniques described herein can be implemented using a direction of stack growth that is based on the one or more directions of stack growth that are supported by the underlying hardware used to implement aspects of the present disclosure. For instance, the systems and techniques described herein can use a higher-to-lower direction of stack growth when implemented using CPU architectures/hardware that supports a higher-to-lower direction of stack growth, and can use a lower-to-higher direction of stack growth when implemented using CPU architectures/hardware that supports a lower-to-higher direction of stack growth. In some embodiments, the layout of run-time stack space in the tasklet stack space memory pool can be implemented to be consistent with a supported stack growing direction of the CPU architecture/hardware used to implement aspects of the present disclosure. For instance, a kernel can allocate stack space for a first running tasklet from the bottom of the stack space memory pool, wherein the bottom of the stack space memory pool is in the opposite of the stack growing direction. For example, if the stack growing direction is from lower memory addresses to higher memory addresses, the bottom of the stack space memory pool is the low memory address boundary. Similarly, if the stack growing direction is from higher memory addresses to lower memory addresses, the bottom of the stack space memory pool is the high memory address boundary. For purposes of illustration and example, reference is made herein to examples wherein allocation is performed from high-to-low, although it is appreciated that low-to-high allocation schemes within the stack pool can also be used, among various others, without departing from the scope of the present disclosure. As noted above, in at least some examples, the direction of stack growth utilized herein can be a property of the CPU architecture and/or hardware components utilized to implement aspects of the present disclosure and/or can be a supported direction of stack growth by the CPU architecture and/or hardware components utilized to implement aspects of the present disclosure.

In some embodiments, a kernel can be used to maintain a preemption list that records the order in which tasklets become preempted by another tasklet. As used herein, the term "preemption list" may be used interchangeably with the term "suspended chain." For instance, the preemption list can be indicative of a corresponding priority that is associated with each respective tasklet of a plurality of tasklets. In some aspects, tasklets having a corresponding priority that is stored in the preemption list can be the tasklets that have been allocated one or more memory addresses within the stack pool (e.g., running tasklet(s), suspended/preempted tasklets, etc.). For example, in a single core platform (e.g., with one running tasklet at a time), the preemption list can include a corresponding priority for a running tasklet and can include a corresponding priority for one or more suspended/preempted tasklets. In some examples. tasklets that have not yet been allocated one or more memory addresses within the stack pool (e.g., pending tasklets, ready tasklets, etc.) are not included in the preemption list (e.g., suspended chain) and/or do not have a corresponding priority. For instance, each tasklet may be assigned its corresponding priority from the time of its creation (e.g., the time at which each tasklet is committed or is to be committed).

As noted above, in some examples a tasklet is assigned a set of contiguous memory addresses within a stack pool to use as its run-time stack, wherein the assignment (e.g., allocation) is performed before the tasklets starts executing. In one illustrative example, if a first tasklet executes and a second tasklet preempts the first tasklet (e.g., before the first tasklet completes execution or otherwise terminates), then the second tasklet is a preempting tasklet with respect to the first tasklet (and the first tasklet is a preempted tasklet with respect to the second tasklet). It is noted herein that reference to one tasklet preempting another tasklet may refer to a user-space or tasklet perspective—in other words, when tasklet A preempts tasklet B, the kernel has found a runnable tasklet A with a higher priority than the currently running tasklet B and in response, suspends tasklet B. The kernel can preserve the stack space of tasklet B according to various configurations, including a minimal stack space preservation configuration where unused stack space of tasklet B is "borrowed" by the higher priority tasklet A or a maximal stack space preservation configuration where unused stack space of tasklet B is preserved. Based on the stack space preservation configuration, the kernel allocates stack space for tasklet A in the stack space memory pool (e.g., a tasklet does not allocate stack space itself, and relies on the kernel to perform the allocation of stack space for the tasklet). In one illustrative example (e.g., when minimal stack space preservation is implemented, as will be described in greater depth below), the kernel can assign the second tasklet a set of memory addresses within the stack pool, utilizing a subset of memory addresses that were previously assigned to the first tasklet. In other words, in at least some embodiments (such as when using minimal stack preservation) a preempting tasklet can "borrow" memory addresses from the corresponding preempted tasklet, wherein the preempting tasklet is allocated memory addresses beginning from the last used memory address of the preempted tasklet at the time of preemption. Notably, the preempting tasklet's starting memory address can be located within the contiguous block of memory (e.g., run-time stack) that was previously allocated to the preempted tasklet.

If the preempting tasklet is not itself preempted by another tasklet, the preempting tasklet can run to completion. In some cases, the preempting tasklet can run to completion using only memory addresses that are located within the remaining portion of the run-time stack assigned to the preempted tasklet (e.g., additional allocation does not need to be performed for the preempting tasklet to run to completion). In other examples, the preempting tasklet can run to completion using all of the memory addresses located within the remaining portion of the run-time stack assigned to the preempted tasklet plus one or more memory addresses located in the free memory space of the stack pool, after/below the run-time stack of the preempted tasklet. In such examples, an additional allocation can be performed to allow the preempting tasklet to expand beyond the run-time stack of the preempted tasklet, into the free memory space of the stack pool that is after/below the run-time stack of the preempted tasklet. In general, the allocation of new stack space can be performed starting from the bottom of the free space in the stack space memory pool, such that the stack space's growing direction is consistent with the stack growing direction (e.g., as described above).

In some embodiments, tasklet stacks are allocated to the stack pool through a linear, last-in-first-out method. When a second tasklet preempts a first tasklet, the second tasklet constructs a run-time stack below the value of the first tasklet's stack pointer (e.g., in the example of high-to-low allocation; if low-to-high allocation is performed instead, the second tasklet would construct a run-time stack above the value of the first tasklet's stack pointer, as noted previously above). If a third tasklet preempts the second tasklet before the second tasklet terminates, then a run-time stack for the third tasklet is constructed below the most recent value of the second stack pointer, etc. As used herein, the terms "run-time stack" and "run-time stack" may be used interchangeably.

Constructing a run-time stack (e.g., also referred to as a run-time stack space) for a preempting tasklet at the next available memory address after the most recent value of the stack pointer (of the preempted tasklet) can be used to reduce and/or prevent the occurrence of non-contiguous memory allocations and/or the occurrence of unused memory interspersed by allocated memory. For instance, if the next available memory address is used, then no unused space is left between the corresponding stacks of the preempted and preempting tasklets, and as such, the occurrence of non-contiguous memory allocations and/or unused memory interspersed by allocated memory can be eliminated. If a tasklet terminates, the memory associated with its run-time stack is freed and returned to the stack pool for use by other potential tasklets (e.g., suspended/preempted tasklets, ready tasklets, pending tasklets, etc.), whereas a tasklet that never terminates would result in undefined system behavior.

In some embodiments, stack pool memory can be freed in constant time (e.g., freed in substantially real time). Advantageously, the tasklets utilized by the presently disclosed systems and techniques consume no additional stack space until they first execute. Moreover, when preempted, the tasklets only occupy as much stack space as immediately needed (e.g., through subroutine calls and/or temporary variables, etc.). Accordingly, any stack memory utilized by a tasklet will contain only valid data that must be preserved.

In contrast, in at least some examples of a conventional prioritized preemptive RTOS, the system may reserve a constant amount of system memory for a task until the task is deleted (e.g., which may result in underutilization of memory, if the task is allocated more memory than needed/requested. Advantageously, a kernel associated with and/or used to implement the presently disclosed systems and techniques may temporarily allocate the reserved, but unused, stack space from a running tasklet to a preempting tasklet having a higher priority that preempts the priority of the running tasklet, thereby reducing or eliminating a source of potential memory underutilization.

In some embodiments, the systems and techniques described herein may attempt to schedule the highest priority job (e.g., task or tasklet) possible at any given time. To satisfy this goal, while a first tasklet runs, a second higher priority tasklet may become schedulable and preempts the first tasklet. In this example, the first tasklet is the preempted tasklet and the second tasklet is the preempting tasklet. In response, the systems and techniques can record this information (e.g., information indicative of the second tasklet preempting the currently running first tasklet) by adding the preempted tasklet (e.g., the first tasklet) to the head of the preemption list. The second tasklet may preempt the first tasklet immediately, wherein the second tasklet transitions to a RUNNING state without being added to the preemption list (e.g., the preemption list/suspended chain may include only tasklets that have been preempted/suspended). The tasklet at the head of the preemption list must be serviced before subsequent tasklets, including tasklets that are lower on the preemption list. In one illustrative example, if tasklet priorities are not altered after a job (e.g., tasklet) is initialized, the preemption list can be seen to record jobs (e.g., tasklets) in order of descending priority. In some embodiments, tasklets of equal priority run to completion and will not preempt each other after one of them is scheduled. In other words, in some embodiments, equal priority tasklets do not share processor time through round-robin or other time-slicing scheduling techniques.

In some aspects, tasks and tasklets may run concurrently and respect the priorities of other jobs in the system. For instance, a user may register either a task or tasklet to the system. However, when registering a tasklet, the user must continue to respect the tasklet interface wherein a tasklet must be designed to run to completion and must not voluntarily yield to other jobs.

In some embodiments, if there are no other available jobs, the systems and techniques described herein can repeatedly schedule an idle tasklet, which has a lowest priority value by default, until another job becomes schedulable. In other embodiments, the idle tasklet may cause the entire system to enter a low-power state to preserve energy. The idle tasklet may also execute a user-defined procedure. In some aspects, explicit committing of an idle tasklet is not performed—the kernel can automatically schedule the idle tasklet, for instance when there are neither ready tasklets nor suspended tasklets.

In some embodiments, a user (e.g., developer, etc.) may modify a job's priority after creating the job with few restrictions. If the user explicitly changes the priority of a job, then the system may switch out the currently running job to respect the new priorities. However, due to the last-in-first-out behavior of a given stack pool, if a preempted tasklet resumes execution before the preempting tasklet terminates, the preempted tasklet may corrupt the preempting tasklet's stack. Thus, a restriction can be enforced by the scheduler where a preempted tasklet must not run until all tasklets ahead of the preempted tasklet (e.g., in the preemption list) terminate. This restriction can be used to ensure that a preempted tasklet does not corrupt the stack of a preempting tasklet. If a preempted tasklet has its priority raised, the raised-priority preempted tasklet must wait for the preempting tasklet (and any other tasklets preempting the preempting tasklet itself) to first terminate. This results in potential priority inversion where a low priority job blocks a high priority job from running. In some embodiments, to prevent priority inversion, the preempting tasklet and any other tasklets preempting the preempting tasklet can have their respective priority values elevated by the scheduler to match the priority value of the preempted tasklet. Consequently, the originally preempting tasklets terminate more expediently to free the stack space above the preempted tasklet and eventually allow the preempted tasklet to be scheduled.

In some aspects, tasklets execute in the background but capture the memory-efficient behavior of nested interrupts which construct a stack frame on top of a preempted interrupt. As a result, the tasklets utilized and scheduled by the presently disclosed systems and techniques can be seen to reduce both memory underutilization that can occur based on allocating more memory than is used, and the occurrence of unused memory interspersed by allocated memory, while remaining preemptible by higher priority tasklets, thereby enhancing the state of the art. Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram depicting an example implementation of a tasklet context switch where a preempting tasklet stack frame is adjacent to a most recent stack pointer, according to some examples;

DETAILED DESCRIPTION

Figure 1:
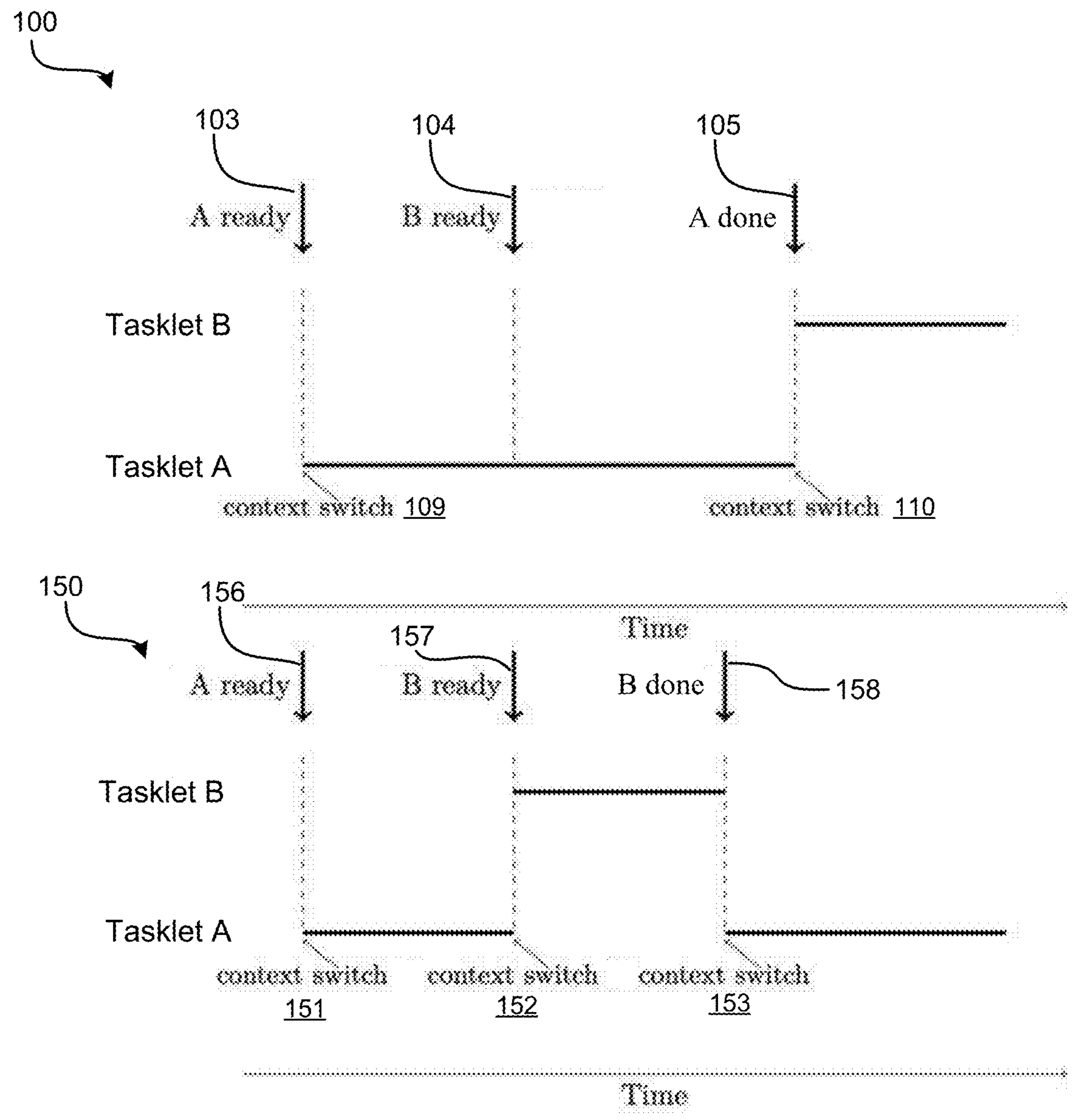
FIG. 1 is a diagram depicting an example of job execution using a conventional first-in-first-out (FIFO) scheduling and using scheduling with prioritized preemption, according to some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Overview

As used herein, the terms “thread” and “job” may be used interchangeably to refer to a subprogram (e.g., subprogram instance) that is capable of being scheduled independently from other subprogram instances. It is noted that in some cases, such as within the field of real-time operating systems, the term “thread” is used synonymously and interchangeably with “task.” In one illustrative example, the “term” job is used to refer to an abstract subprogram that can be independently scheduled from other jobs. A job can be designed using a persistent style (e.g., tasks) or using a run-to-completion style (e.g., tasklets). In other words, a run-to-completion job can be referred to herein as a “tasklet.” A run-to-completion job can be the same as a “run-to-completion thread,” both of which can be referred to as “tasklets.” The terms “run-to-completion” and “run-to-termination” are used interchangeably herein. In some aspects, tasklets correspond to fire-once event handlers, whereas tasks correspond to persistent threads that run a forever loop that may become blocked or yield to allow other jobs (e.g., threads) to execute.

As described herein, reference is made to examples based on a real-time operating system (RTOS) implementation of aspects of the present disclosure. However, it is noted that this is done for purposes of clarity of illustration and example, and is not intended to be construed as limiting—it is appreciated that the systems and techniques described herein can be implemented in various computing environments, platforms, devices, etc., including, and in addition to, an RTOS, without departing from the scope of the present disclosure.

As noted previously, jobs may be scheduled to receive processor time, paused, and resumed. A plurality of jobs may share a single processor core (e.g., in single-core implementations, or with reference to a particular core of a multi-core implementation) and the kernel (e.g., a kernel-implemented scheduler) may switch between jobs as appropriate. When switching from one job to another, the scheduler saves the job context (the program state information necessary for the thread to later resume job execution). For example, program state information can include the value of the instruction pointer, stack pointer, and memory layout. The implementation of a job context switch affects the performance and allowed behavior of thread scheduling. Generally, a job context switch is performed by saving the current job context to be restored at a later time and subsequently performing loading of the next job context. Job context switching procedures are often implemented at least partially through hardware architecture-specific machine instructions.

Various software and/or computer-implemented programs may face real-time requirements where the correctness of a program depends not only on functional correctness but also temporal correctness: the program must complete a job correctly but also within a timing deadline. For example, the deployment of airbags or anti-lock braking must be completed within a given deadline to be considered useful. A system that satisfies real-time requirements is not necessarily a low-latency system but rather it responds in a timely manner with respect to a specified deadline. For such systems, usage of a real-time operating system (RTOS) is often appropriate. The two most prominent RTOS services are priority-based multithreading and preemptive multithreading. If both services are included, the RTOS services “prioritized preemptive multithreading.”

A RTOS that services priority-based multithreading allows the embedded developer to assign priorities to a job, and the kernel schedules jobs while respecting priority. A scheduling approach that schedules the highest priority thread possible can be referred to as prioritized scheduling. A developer can assign time-sensitive jobs a higher priority, and an RTOS that services prioritized multitasking will schedule such jobs before non-time-sensitive jobs. This makes it easier to satisfy and verify timing requirements.

A RTOS that services (e.g., in a kernel-based implementation) preemptible multithreading can force (e.g., preempt) a running job to yield control to another job. In the context of the present disclosure, the term “preemption” can be used to refer to the stronger kernel-based preemption where the scheduler may forcibly take control from an executing job without an explicit yield signal from the executing job. In some examples, it is easier to respect timing deadlines with preemption since the kernel may preempt a running job on behalf of a critical real-time job. Without kernel-based preemption, a high-priority job must wait for a running thread to voluntarily yield by either terminating or making an explicit yield call. In addition, kernel-based preemption better encapsulates jobs since fewer explicit yield calls, if any, are needed in the thread code. Consequently, a given job is less dependent on the proper behavior of other jobs.

An RTOS that services kernel-based preemption can be referred to as "preemptive." An RTOS that does not service kernel-based preemption can be referred to as "non-preemptive" (e.g., examples of non-preemptive scheduling can include, but are not limited to one or more of, cooperative, time-slice, round-robin, etc., and combinations thereof. . . . In some cases, preemptive multithreading can be used over cooperative multithreading on the basis that the behavior of a preemptive multithreading system is a superset of a cooperative multithreading system. For instance, software developed for a preemptive RTOS can be ported to preemptive RTOS, but may be less easily ported from a preemptive to cooperative RTOS. Safety critical applications may even require an RTOS to service preemptive multithreading to verify program correctness. An OS that services preemption often services priority-based multithreading. However, it is possible for a system to implement preemptive multithreading but not priority-based scheduling.

Aspects of the present disclosure are directed to the subfield of embedded real-time operating systems, as the embedded systems field may benefit greatly from the improved resource utilization achievable according to the systems and techniques described herein. For instance, embedded systems often lack a memory management unit (MMU), and as such, embedded systems programs often run in physical memory space. Accordingly, the present disclosure makes reference to various examples and illustrations of physical memory, although it is noted that the systems and techniques described herein may additionally, or alternatively, be utilized in the context of virtual memory without departing from the scope of the present disclosure. Moreover, the systems and techniques described herein can be utilized in the context other subfields such as time-sharing operating systems, among various others, again without departing from the scope of the present disclosure.

In existing approaches, the vast majority of programs, including those compiled from the C language, depend on a call stack as scratch space to store temporary data. A call stack is a linear, push-down data structure that grows and shrinks from one end. For example, a stack can be used to save automatic (e.g., local) variables and/or to save a subroutine's context when the subroutine calls another subroutine, among various other uses. Programs must follow subroutine calling conventions, which can depend on the system's Application Binary Interface (ABI). When calling a subroutine, the subroutine prologue (e.g., a procedure to save callee state, often to the stack) executes first. The subroutine prologue can be executed to perform actions including saving registers such as the program counter (e.g., so the calling routine can be resumed) and callee-saved registers to the stack. For certain ABIs, subroutine arguments may also be pushed to the stack. When a subroutine completes, the previously stored state is restored.

A stack frame is the data structure created on the stack by a subroutine call. A stack frame comprises the memory within the stack that the subroutine manages and may include the saved instruction pointer, local variables, and subroutine arguments.

Almost all programs utilize a stack during execution. The stack requires an additional value to maintain state: the stack pointer (SP), which marks the boundary of the stack separating valid and invalid data. The stack interface has two main operations: PUSH and POP. A PUSH operation saves a value to the stack (e.g., grows the stack and moves the SP in the direction of stack growth) while a POP operation loads a value from the stack (e.g., shrinks the stack and moves the SP in the opposite direction from the stack growth direction). The call stack is fundamental, and modern instruction sets implement PUSH and POP as machine instructions and store SP with a dedicated hardware register (e.g., dedicated CPU register). The stack pointer is conventionally initialized to the highest address of the stack and grows down towards lower addresses (e.g., in examples where a downward direction of stack growth is implemented). In the context of the present disclosure, terms such as "growing the stack" and "on top of the stack" may be used to refer to a stack that increases in size towards lower memory addresses. Thus, a PUSH operation stores a value to the stack and decrements SP whereas a POP operation increments the SP and loads the value that was stored in the stack. It is noted that PUSH and POP operations can be implemented as single CPU instructions. For instance, for a PUSH operation, a single CPU instruction can be used to decrement the SP and store a value to the stack; for a POP operation, a single CPU instruction can be used to increment the SP and load a value that was stored in the stack. The size of a stack is limited by the size of the hardware's memory. It is again noted that the systems and techniques described herein can additionally, or alternatively, be implemented based on growing the stack towards higher memory addresses, without departing from the scope of the present disclosure.

In existing microcontroller architectures, a program may execute in either the background (e.g., variously referred to as "background state." "process context," "lower half," etc.) or may execute in the foreground (e.g., variously referred to as "foreground state interrupt context," "upper half," etc.). Many program instructions execute in the background, while asynchronous, exceptional events may be handled in the foreground. For instance, the main subroutine of a C-language program runs in the background. A signal, which may originate from either hardware or software, can interrupt a microcontroller and cause the microcontroller to switch to the foreground state, handle (or at least acknowledge) the signal, and restore the background state. Switching to the foreground involves pushing registers such as the program status register, program counter, stack pointer, and various general purpose registers to the stack, to save the background's context. The program counter then takes on the value of a function pointer that points to a subroutine called an interrupt handler to handle the interrupt. When the interrupt handler terminates, the original program counter, stack pointer, and other general-purpose registers are popped from the stack, restoring the original process context. The mechanism to switch between foreground and background is often implemented by the hardware architecture.

The foreground is asynchronous to the background (e.g., a foreground routine can be interwoven between the machine instructions of a background routine). The subroutine running in background is unaware whether an interrupt has occurred apart from checking certain volatile variables. When an exception is raised, the processor saves the background state, switches to interrupt mode, handles the exception, and restore the background state. As a result, the subroutine running in process context resumes execution as normal.

Interrupt handlers can be designed to run quickly and deterministically to minimize the time when other interrupts are disabled. If an interrupt takes too long, another interrupt signal may fail to latch, and the processor may miss the signal. For example, a GPIO pin (General Purpose Input/Output pin) may only be active for a brief period before returning to the inactive level, and if another interrupt is being handled, the microcontroller may fail to respond accordingly. Even if an interrupt source is latched, one interrupt may block other interrupts from being handled, increasing the latency of other critical event handling.

In the context of the present disclosure, the term "job" is used to refer to an abstract subprogram that can be independently scheduled from other jobs. As noted previously above, a job can be designed using a persistent style (e.g., referred to as "tasks") or using a run-to-completion style (e.g., referred to as "tasklets"). Tasklets may correspond to fire-once event handlers, whereas tasks can correspond to persistent threads that run a forever loop that may become blocked or yield to allow other jobs to execute.

Systems that lack an OS are known as "bare metal," as a software developer must interface with the hardware more directly and with fewer abstractions. In bare metal embedded development, the super-loop software pattern is common. After the processor resets and after an initialization procedure, the program control flow reaches a while (true) infinite loop (e.g., referred to as the super-loop). In the super-loop body, the program may poll for an external event via a peripheral or via a volatile variable altered by an interrupt handler. Based on the polled result, the super-loop may call the corresponding subroutine to handle the event. The super-loop is a straightforward way to develop software on bare-metal platforms and is most applicable when the overall application is simple. However, if the application is complicated and software development spans a long period with new requirements emerging during the development process, the super-loop approach becomes problematic. It becomes harder to reason about a program since unrelated functionalities are not encapsulated from each other. Another outstanding problem is timing control: with more and more complexity squeezed into the super loop, worst-case event response times increase. As previously mentioned, some applications are time sensitive and a failure to respond in a timely manner could be catastrophic.

Another design pattern that expands upon the super-loop pattern is the work queue pattern where external events are added to a message queue and the super-loop body polls and responds accordingly to events in the message queue. An event could be sent to the message queue from an ISR or during the processing of another message. This approach consolidates information flow from an event to the super-loop for event handling. The message interface commonly comprises of an entry function pointer to a pre-defined subroutine to handle the message and a universal pointer type parameter that may point to an arbitrary data block. This message abstraction balances interface simplicity and flexibility. The present disclosure introduces the term "tasklet", wherein the "tasklet" is a job designed to run to completion. As contemplated herein, tasklets are a type of job (e.g., a type of thread). In some embodiments, when designing callback functions for a tasklet, a restriction is imposed where callback functions must not voluntarily suspend themselves with a blocking call.

Existing tasklet approaches suffer from poor timing control since conventional tasklets are non-preemptible and often non-prioritized. Messages may arrive without a distinction between high and low priority messages which results in potential timing problems; a critical message may face delays when the system already has several messages in the queue. In some cases, a priority tag may be attached with each message, modifying the queue data structure to a priority queue. Adding a priority tag to messages can allow the scheduler to distinguish and dispatch higher priority messages for expedited processing. However, without preemption, a critical message handler that wishes to run must first wait for a slower, non-critical message handler to terminate. A timing issue could be indeterministic, subtle, and difficult to identify and to solve.

To service prioritized preemptive multithreading, a conventional RTOS services "tasks" (e.g., task-style jobs) rather than tasklet-style jobs. Tasks are persistent RTOS objects that exist until explicitly deleted, and they are often constructed and initialized during the program's initialization phase. Tasks are also a subset of jobs. Tasks are designed with a super-loop so that the task subroutine never returns (e.g., never terminates). Within the super-loop body, a task may make a blocking call (e.g., to delay, acquire a mutex, wait for data, etc.) where the task may yield, giving other jobs the opportunity to run. Tasklets and work queues are used to implement subsystems comprising software timers in some conventional RTOS's. The subsystem itself is implemented as a task such that if a tasklet scheduled by the task were to voluntarily block, the tasklet would inadvertently block other unrelated tasklets in the subsystem from running.

Returning to the description above of the stack, to run, a job must first reserve a properly-sized stack. A job is allocated a fixed-sized stack that it must not underflow or overflow. Even jobs running on MMU-based architectures with virtual memory are susceptible to stack underflows and overflows. In some cases, it is impossible to statically determine a job's worst-case stack usage, so it is the responsibility of the developer to properly specify a stack size. A conventional prioritized preemptive RTOS uses tasks which each require a unique stack. These stacks are memory blocks (e.g., usually on the order of several kilobytes), and maintaining a unique stack for each task presents a significant memory overhead. This is a major obstacle preventing adoption of a prioritized preemptive RTOS on low-RAM computers. Each task stack comprises contiguous memory such that the worst case run time of the thread does not cause an overflow and exceed the assigned boundaries (see, for example, the various example memory layouts 402-409 of FIG. 4, each of which will be described in greater detail below).

Each task requires its own unique stack (e.g., its own unique stack space), which can present significant memory overheads when memory management is not performed efficiently (e.g., when tasks are allocated more memory than needed, requested, used, etc.; when unused or free memory is interspersed by allocated memory; etc.). For instance, in at least some examples, when a program must dynamically allocate and free various-sized blocks of memory from a heap, one or more free gaps (e.g., unused memory addresses) might be left between allocated memory blocks, and may become unusable. In some scenarios, continuously allocating and freeing a memory block may eventually cause allocation to fail because another heap object partially occupies the previously free block. Attempts to borrow or recycle stack memory by repeatedly creating and deleting tasks may be insufficient, for instance based on an absence of guarantees that memory allocation will succeed when creating the task using dynamic memory allocation. For safety critical embedded systems such as those found in aircraft and automobiles, dynamic memory allocation can be undesirable.

As noted previously, a first example type of memory underutilization can occur when the system assigns a block of memory to a job but the job fails to utilize the entire block. A second example type of memory underutilization can occur when small blocks of free memory are allowed to form between the blocks that have been assigned to a job; the system may encounter the scenario where a free block exists but is too small to be useful (e.g., too small to be allocated or assigned to a job). In a conventional resource-constrained embedded platform, allocating stacks statically can be implemented to address issues of small blocks of free memory interspersed between assigned blocks of memory, but in at least some cases does not address underutilization of memory within the assigned blocks. In some cases, blocks of free memory interspersed between blocks of assigned memory may be a less severe problem on a system with a memory management unit (MMU) (e.g., discrete paged physical memory could perform page-mapping to implement a continuous paged virtual memory, etc.)

At a given instance, at most one task runs while the other tasks have their own exclusive stacks that they do not actively use. In practice, a task almost never reaches the edge of the block allocated for its stack. Consequently, the block allocated for the task stack will have regions that do not contain useful data. Thus, there are multiple blocks of memory dedicated to task stacks that are only partially contain useful data (e.g., there is memory that has been allocated but is not usable by the system).

By reducing memory underutilization within an assigned block of memory, a microcontroller may require less RAM to perform all its necessary functions, saving production costs and reducing total RAM needed which generally reduces power consumption. This significant decrease in RAM overhead can allow applications to use RTOS in ultra-RAM constrained environments such as microcontrollers with lower power consumption and limited RAM that otherwise could not support an RTOS. Existing systems that use an RTOS would experience less engineering pressure to reduce memory consumption.

Aspects of the present disclosure provide a prioritized preemptive operating system with stack sharing and/or an improved efficiency stack space layout. In one illustrative example, the systems and techniques described herein can be used to enable the continuous and deterministic recycling of job stacks (e.g., job stack spaces) with the tasklet memory model, as will be described in greater depth below.

Example Embodiments

The systems and techniques described can be used to implement memory-efficient threads, including (but not limited to) in real-time operating systems running on memory-constrained systems. It is appreciated that the systems and techniques described herein can additionally, or alternatively, be used to implement memory-efficient memory threads in various and/or more general scheduling systems.

In at least some cases, it is possible that a conventional RTOS may implement a stack memory pool shared by a multitude jobs wherein tasklets execute in background context or may implement prioritized, kernel-based preemption, but not both. In one illustrative example, the systems and techniques described herein can implement both simultaneously. Tasklets are units of execution that run-to-completion and terminate. Tasklets are conventionally non-preemptive (e.g., using conventional first-in-first out (FIFO) scheduling, etc.) and implemented through a work queue pattern that can be found in Unix-like operating system kernels and RTOS subsystems such as the timing and networking subsystems. Under the work queue pattern, a single thread handles tasklets (work requests, messages) as they become ready. For example, a conventional preemptive RTOS may implement the software timer subsystem (which handles jobs that are deferred by a timer) through a hidden timer daemon task. The timer task executes an event handler when the corresponding timer expires. However, a restriction is imposed where an event handler for systems such as the timer system must not voluntarily block because the blocked tasklet would block other unrelated tasklets within the same subsystem from running. For example, a plurality of tasklets that are merely waiting on a timer to expire should not be blocked by each other. Without preemption, in a subsystem (e.g., such as a timer subsystem) non-preemptible tasklets must run sequentially one after another. The preemptible tasklets implemented by the systems and techniques described herein may preempt one another if necessary to respect priorities.

For instance, a FIG. 1 is a diagram depicting an example of job execution using a conventional first-in-first-out (FIFO) scheduling 100 (e.g., upper portion of FIG. 1) and using scheduling with prioritized preemption 150 (e.g., lower portion of FIG. 1), according to some examples.

Consider two tasklets, Tasklet A and Tasklet B, within the subsystem responsible for software timers, where Tasklet A is non-essential and Tasklet B is real-time. Within the subsystem, each tasklet has a corresponding timer wherein the tasklet becomes schedulable after the timer expires. In a conventional scheduling system 100, if Tasklet A's timer expires first and Tasklet A is the only schedulable job, then at time 103 (e.g., "A ready") the processor executes Tasklet A. A context switch 109 may occur from the idle tasklet to Tasklet A. Later, but before Tasklet A terminates, Tasklet B becomes ready at time 104 (e.g., "B ready"), for example when the respective timer for Tasklet B expires. The processor only switches context to Tasklet B (e.g., at context switch 110) after Tasklet A finishes executing at time 105 (e.g., "A Done". As a result, a non-essential tasklet (e.g., Tasklet A) can, in the conventional FIFO scheduling example 100, delay the execution of a real-time tasklet (e.g., tasklet B).

In one illustrative example, the systems and techniques described herein can be used to implement the scheduling with prioritized preemption 150. In such examples, a developer can assign a higher priority to real-time Tasklet B and a lower priority to non-essential Tasklet A. If the timer corresponding to Tasklet A expires at time 156 (e.g., "A ready"), the scheduler switches via context switch 151 to Tasklet A, thereby allowing Tasklet A to execute. However, when the timer corresponding to Tasklet B subsequently expires at time 157 (e.g., "B ready"), Tasklet B preempts Tasklet A and begins executing as a preempting tasklet. In particular, the scheduler performs a context switch from Tasklet A to Tasklet B via context switch 152. When Tasklet B terminates, the scheduler performs a context switch 153 back to Tasklet A and Tasklet A resumes execution. Using the systems and techniques described herein, a real-time Tasklet B executes to completion at time 158 ("e.g., "B done"), which occurs before Tasklet A executes to completion, despite Tasklet A beginning execution first.

Figure 2:
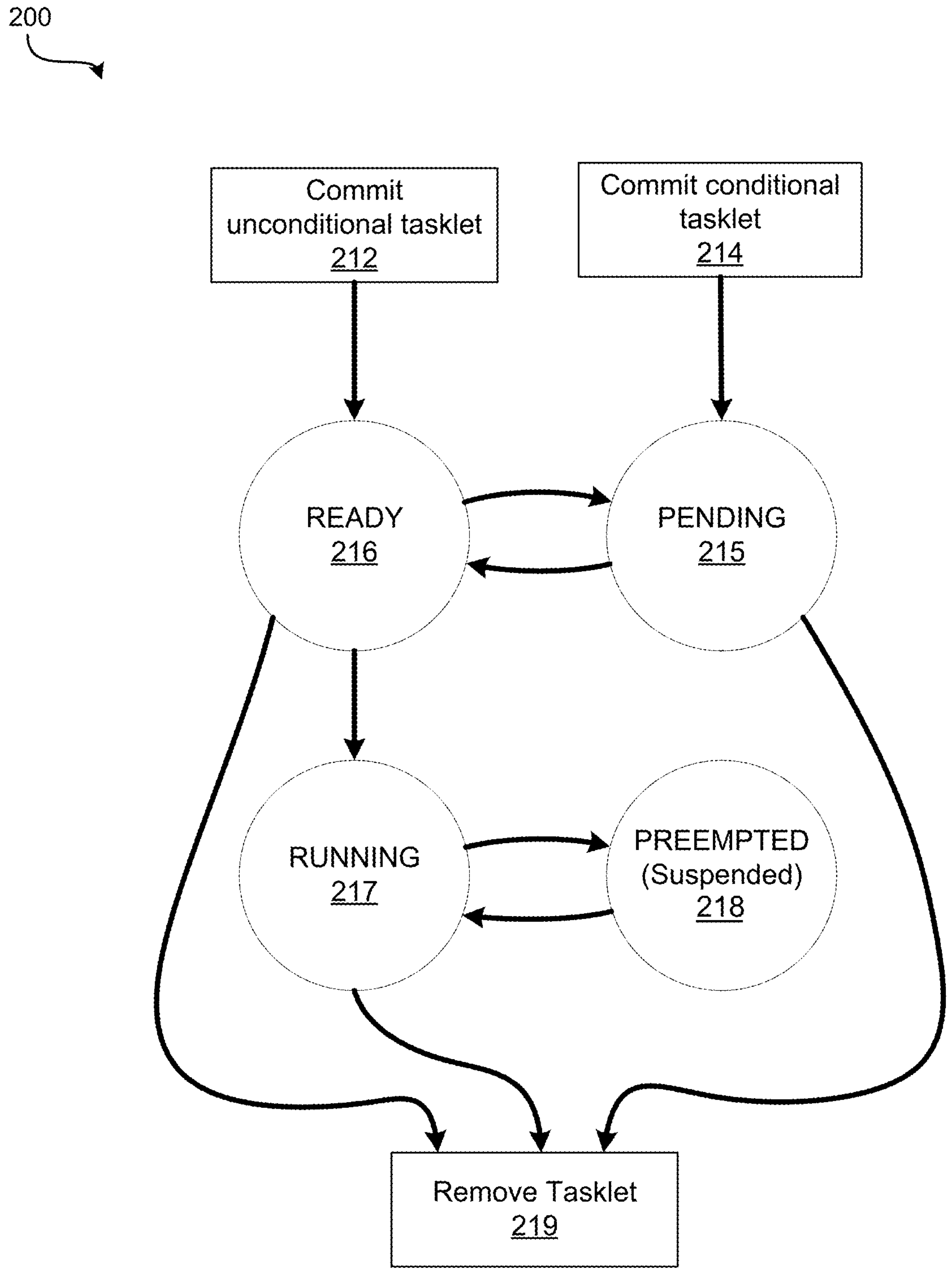
FIG. 2 depicts an example state diagram corresponding to a preemptive tasklet, according to some examples.

FIG. 2 depicts an example state diagram 200 corresponding to the execution of preemptive tasklets, according to some examples. In particular, the example state diagram 200 corresponds to committing one or more unconditional tasklets 212 and/or committing one or more conditional tasklets 214. For example, the one or more unconditional tasklets 212 can be committed using a corresponding system call and the one or more conditional tasklets 214 can be committed using a corresponding system call. The unconditional tasklets 212 and conditional tasklets 214 will be described in greater depth below.

In one illustrative example, a tasklet may undertake up to five scheduling states throughout its scheduling life-cycle. In embodiments where a tasklet does not have an explicit TERMINATED state, a tasklet may undertake up to four scheduling states throughout its scheduling life-cycle. For example, in some embodiments, a tasklet may undertake one of the four scheduling states PENDING 215, READY 216, RUNNING 217, and PREEMPTED 218 (e.g., also referred to as a "suspended" state or "SUSPENDED 218"). In embodiments where a tasklet may have an explicit TERMINATED state, the five scheduling states can include PENDING 215, READY 216, RUNNING 217, PREEMPTED 218, and TERMINATED (e.g., associated with Remove Tasklet 219). In some examples, a tasklet can be assigned a TERMINATED state in response to the tasklet terminating or otherwise running to completion. In such examples, the tasklet can proceed from the TERMINATED state to tasklet removal 219. In other examples, assigning a tasklet the TERMINATED state can be the same as performing tasklet removal 219 (e.g., assigning the TERMINATED state can be the same as performing tasklet removal 219 and/or the TERMINATED state and tasklet removal 219 can occur simultaneously). As mentioned previously, in some embodiments, a tasklet is not assigned a TERMINATED state, and instead, at the time of tasklet termination, the kernel removes the terminated tasklet completely and reclaims all resources previously assigned to the now terminated tasklet at tasklet removal 219. In other words, the tasklet removal 219 depicted in the state diagram 200 can be indicative of an explicit TERMINATED state, can be indicative of a tasklet removal operation, or both. The tasklet removal 219 can also be indicative of tasklet termination that is performed without the use of a terminated state.

In some embodiments, a tasklet's scheduling state may be directly encoded in its job control block (JCB). In some embodiments, a tasklet's scheduling state may be inferred from the system state. As illustrated, a conditional tasklet 214 (e.g., which can be created from a system call to the corresponding kernel) can be created and may start in the PENDING state 215. For instance, in the PENDING state 215, the conditional tasklet 214 is waiting for a particular system event to occur before it can run (e.g., the occurrence of the particular system event is a condition associated with the conditional tasklet 214). In some embodiments, the PENDING state 215 replaces the blocked, suspended, or waiting states in conventional RTOS systems.

A conditional tasklet 214 transitions from PENDING state 215 to READY state 216 on a conditional event that is specified by the user when the conditional tasklet 214 was created. For instance, the conditional event can be specified by the system call to the kernel used to commit the conditional tasklet 214. A conditional event can include, but is not limited to, events such as acquiring one or more semaphores or mutexes, the expiration of one or more timers, one or more unconditional events, and/or compositions and combinations of such events, etc.

In some embodiments, a tasklet in the PENDING state 215 or the READY state 216 can be canceled by another tasklet or an ISR. For instance, a PENDING or READY tasklet that is canceled by another tasklet or an ISR can transition to tasklet removal 219, without running (e.g., without entering the RUNNING state 217 and/or the PREEMPTED/SUSPENDED state 215).

If a conditional tasklet 214 is conditioned on an unconditional event which is satisfied immediately, the conditional tasklet 214 immediately transitions to the READY state 216. If an unconditional tasklet 212 is committed, then the unconditional tasklet 212 can begin in the READY state 216 (e.g., an unconditional tasklet 212 skips the PENDING state 215 that is used to evaluate for or otherwise detect the occurrence of one or more condition(s) that trigger a conditional tasklet 214 to transition from the PENDING state 215 to the READY state 216).

A tasklet in the READY scheduling state 216 signals to the scheduler that the READY tasklet is ready to execute at the next opportunity. Recall that a prioritized scheduler schedules the highest-priority job in a READY state (e.g., such as READY state 216 of FIG. 2). Thus, if a tasklet is READY 216 and has the highest unique priority of all jobs (tasklet or task) in the system, then a context switch occurs such that the READY tasklet will be scheduled and put into the RUNNING state 217. In some embodiments, a tasklet in the RUNNING state 217 cannot be canceled by other tasklets, and will run to completion. In some aspects, upon running to completion a tasklet can terminate itself by invoking a corresponding kernel service (e.g., such as the tasklet removal 219). A tasklet in the RUNNING state 217 actively uses processor time and other system resources associated with execution (e.g., running) of the tasklet. When the tasklet finishes, it can enter a TERMINATED state (e.g., if a TERMINATED state is used or otherwise coexists with the tasklet removal 219) signifying that its resources comprising of its JCB, the memory used for its run-time stack, and system resources such as mutexes can be released. As noted above, in some embodiments, when a tasklet finishes being processed (e.g., runs to completion, exits the RUNNING state 217, or otherwise terminates), the tasklet can be terminated via the tasklet removal 219 and the kernel can remove the terminated tasklet and reclaim all assigned resources without using an explicit TERMINATED state.

In one illustrative example, the tasklets utilized in the context of the presently disclosed systems and techniques may additionally undertake a PREEMPTED scheduling state 218, which has no such analog in a conventional preemptive system. In some aspects, the PREEMPTED state 218 can also be referred to as a SUSPENDED state 218. For instance, in a conventional RTOS, a preempted job would simply be in the READY state. However, the systems and techniques described herein distinguish between the READY state 216 and the PREEMPTED state 218 (e.g., SUSPENDED state) because a PREEMPTED tasklet will occupy stack memory, while a READY tasklet will not occupy stack memory. For instance, as contemplated herein, a tasklet only occupies stack memory when it is in the RUNNING state 217 or is in the PREEMPTED state 218. Since a tasklet in the PREEMPTED state 218 occupies stack memory, it can be desirable to terminate the tasklet as soon as possible. Accordingly, in some embodiments, if two equal priority tasklets are runnable (either READY 216 or PREEMPTED 218), then the PREEMPTED state 218 tasklet has precedence (e.g., is prioritized for execution over an equal priority tasklet that is in the READY state 216).

If multiple tasklets in the PREEMPTED state 218 have the same priority, then the tasklet at the head of the preemption list has precedence (e.g., is prioritized for execution via transitioning to the RUNNING state 217) over the other PREEMPTED state 218 tasklets that are lower in the preemption list. As mentioned previously, the preemption list can be maintained by a kernel used to implement the presently disclosed prioritized and preemptible tasklet scheduling. In some embodiments, within the order specified by the preemption list, the next tasklet in the sequence (e.g., the tasklet immediately below the position of a preceding tasklet in the preemption list) should always have lower or equal priority to all preceding tasklets (e.g., both the immediately preceding tasklet, and any further preceding tasklets that are above the immediately preceding tasklet). Unlike the traditional model where tasks run indefinitely, the tasklets described herein are designed to terminate (e.g., run-to-completion or run-to-termination) based on the scheduling system recycling stack space for tasklets efficiently.

For instance, suppose a higher priority (e.g., Tasklet B) becomes schedulable while another lower priority tasklet (e.g., Tasklet A) executes. In this example, Tasklet A would transition state from RUNNING 217 to PREEMPTED 218. Based on transitioning to the PREEMPTED state 218, Tasklet A can be added to the head of the preemption list maintained by the kernel. Tasklet B takes on the RUNNING state 217. In this example, Tasklet B is the "preempting tasklet" and Tasklet A is the "preempted tasklet." Eventually, Tasklet B terminates at 219, and in doing so, exits from the RUNNING state 217. In some cases, the systems and techniques may be configured to repeatedly schedule Tasklet B immediately after terminating, causing Tasklet A to starve. However, starvation is a phenomenon also observed in a conventional OS, and it is the ultimate responsibility of the OS user to address (e.g., as noted above, starvation of Tasklet A would occur as a configured behavior, rather than an innate behavior of the scheduler used to implement tasklets based on the example state diagram 200 of FIG. 2).

Continuing in the example above, if Tasklet B eventually terminates at 219 (or otherwise exits the RUNNING state 217 based on Tasklet B terminating), and Tasklet A has at least the highest priority as any other READY 216 job, then Tasklet A transitions back from PREEMPTED 218 to RUNNING 217. When Tasklet A transitions back to the RUNNING state 217 (e.g., and exits the PREEMPTED state 218), Tasklet A can be removed from the head of the preemption list.

However, if another job (e.g., another tasklet, other than the preempted Tasklet A) has a higher priority, then that job (e.g., tasklet) will be scheduled instead, and Tasklet A will remain in the PREEMPTED state 218 until Tasklet A is the highest priority job in the system with no other tasklet in the RUNNING state 217. For instance, if Tasklet A is the highest priority job in the system and no other tasklet is currently in the RUNNING state 217, Tasklet A will transition from PREEMPTED to RUNNING 217 and thereby resume execution, until either terminating or again being preempted. On the other hand, if Tasklet A is the highest priority job in the system, but another tasklet is currently occupying the RUNNING state 217, then Tasklet A may remain in the PREEMPTED state 218 (e.g., another tasklet currently occupying the RUNNING state 217 can preclude or block Tasklet A from transitioning out of the PREEMPTED state 218).

Note that while Tasklet B runs (e.g., RUNNING state 217), a third Tasklet C with even higher priority than Tasklet B may become ready (e.g., READY state 216) and preempt Tasklet B. In this example, Tasklet B would become a preempted tasklet and pushed to the head of the preemption list. Tasklet C would become the most recent preempting tasklet, and would transition from READY 216 to RUNNING 217. Note that Tasklet B is a preempted tasklet by Tasklet C, but a preempting tasklet to Tasklet A. Accordingly, in this example the preemption list would contain Tasklet B at the head of the preemption list, with Tasklet A below Tasklet B in the preemption list. After Tasklet C terminates (e.g., exits the RUNNING state 217), Tasklet B can resume based on transitioning from PREEMPTED 218 to RUNNING 217. Similarly, after Tasklet B terminates (e.g., exits the RUNNING state 217), Tasklet A can then resume based on transitioning from PREEMPTED 218 to RUNNING 217. It is also possible that one or more of Tasklet B and Tasklet A (or both) is again preempted before it eventually terminates.

Figure 3A:
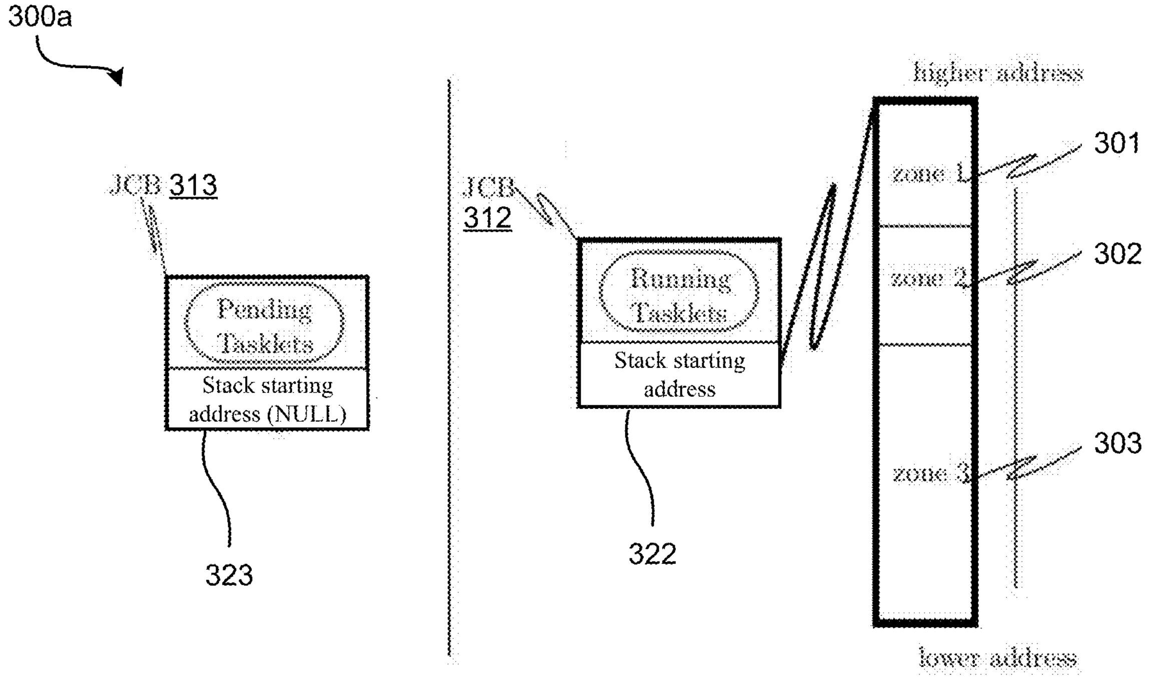
FIG. 3A is a diagram depicting an example tasklet space memory pool (e.g., tasklet stack space memory pool) and job control blocks (JCBs) corresponding to a set of pending tasklets and one or more running tasklets, according to some examples.

FIG. 3A is a diagram 300*a* depicting an example tasklet space memory pool and job control blocks (JCBs) corresponding to a set of pending tasklets and a set of running tasklets, according to some examples. As used herein, the terms "tasklet space" and "tasklet stack space" may be used interchangeably. For instance, the term "tasklet space memory pool" can be used interchangeably with "tasklet stack space memory pool," referring to a memory pool for allocating stack space for a particular tasklet. In some aspects, the pending tasklets depicted in FIG. 3A can be associated with JCBs 313 (e.g., each pending tasklet can be associated with a respective JCB 313). In some embodiments, the pending tasklets depicted in FIG. 3A can be tasklets associated with the PENDING state 215 of FIG. 2. In particular, the pending tasklets of FIG. 3A can be conditional tasklets the same as or similar to the conditional tasklets 214 described above with respect to FIG. 2. While in the PENDING state, each pending tasklet can have a respective stack starting address 323 that is NULL (e.g., because PENDING state tasklets are not allocated memory addresses or resources).

A running tasklet can be associated with a JCB 312 and a stack starting address 322, as depicted in FIG. 3A. For instance, the stack starting address 322 can correspond to the starting memory address of a first zone or block of memory addresses 301 in the stack pool represented on the right-most side of FIG. 3A. The stack pool is additionally shown as including a second zone 302, that includes memory addresses that are lower than the memory addresses associated with the first zone 301; and a third zone 303, that includes memory addresses that are lower than the memory addresses associated with the second zone 302 and that are lower than the memory addresses associated with the first zone 301. In some embodiments, the running tasklet depicted in FIG. 3A can be the same as or similar to a tasklet in the RUNNING state 217 depicted in and described above with respect to FIG. 2.

Figure 3B:
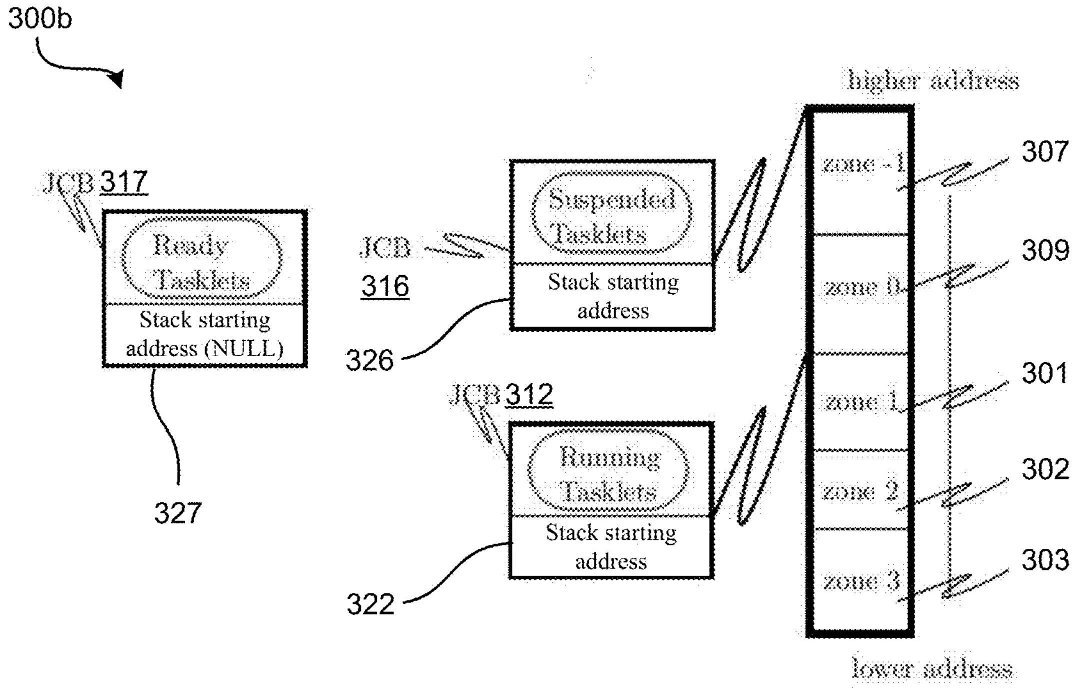
FIG. 3B is a diagram depicting an example tasklet space memory pool (e.g., tasklet stack space memory pool) and JCB corresponding to a set of ready tasklets, a set of suspending tasklets, and a set of running tasklets, according to some examples.

FIG. 3B is a diagram 300*b* depicting an example tasklet space memory pool (e.g., tasklet stack space memory pool) and JCBs corresponding to a set of ready tasklets, a set of suspending tasklets, and a set of running tasklets, according to some examples. In some aspects, the running tasklet depicted in FIG. 3B can be the same or similar to the running tasklet depicted in FIG. 3A (e.g., and the JCB 312 of FIG. 3B can be the same as the JCB 312 of FIG. 3A; the stack starting address 322 of FIG. 3B can be the same as the stack starting address 322 of FIG. 3A; etc.)

FIG. 3B additionally depicts one or more ready tasklets, each of which is associated with a JCB 317 and a stack starting address 327. In some embodiments, the ready tasklets depicted in FIG. 3B can be the same as or similar to tasklets in the READY state 216 depicted in and described above with respect to FIG. 2 (e.g., and may be unconditional tasklets 212 and/or conditional tasklets 214, both as depicted in FIG. 2 and also described above). In some embodiments, the stack starting address 327 associated with a ready tasklet can be NULL (e.g., because READY state tasklets are not allocated memory addresses or resources).

Also depicted in FIG. 3B are one or more suspended tasklets, each of which is associated with a JCB 316 and a stack starting address 326. In one illustrative example, each suspended tasklet of FIG. 3B can be the same as or similar to a tasklet in the PREEMPTED state 218 of FIG. 2. As illustrated in FIG. 3B, a suspended (e.g., PREEMPTED) tasklet can be associated with one or more memory addresses within the stack pool that are higher than (e.g., above) the memory addresses associated with a running tasklet. For instance, the running tasklet shown in FIG. 3B is associated with a set of memory addresses beginning at the stack starting address 322 and corresponding to the first zone 301 within the stack pool.

A first suspended tasklet corresponds to the "zone −1" memory addresses 307, which are higher than (e.g., above) the set of memory addresses corresponding to the first zone 301. In some embodiments, the "zone −1" memory address 307 can contain valid data for a suspended tasklet (e.g., a tasklet in the PREEMPTED/SUSPENDED state 215 of FIG. 2). The "zone 0" memory addresses 309 can be preserved as a "growing zone" of stack space for the first suspended tasklet (e.g., and may correspond to implementation of a maximal preservation configuration for tasklet stack space, for instance configured at tasklet creation). For instance, in some embodiments the "zone −1" memory addresses 307 can contain preserved temporary data for a suspended tasklet (e.g., of a total set of memory addresses allocated to the now-suspended tasklet, zone −1 can be the portion utilized prior to the tasklet being preempted/suspended). More generally, a zone labeled as zone −N can represent a set of memory addresses corresponding to a currently suspended (e.g., preempted tasklet), where greater values of N are located deeper in the suspended chain. For instance, a zone −2 can correspond to a suspended tasklet that was preempted by the now-suspended tasklet corresponding to zone −1, etc. In some embodiments, each suspended (e.g., preempted) tasklet can be associated with a corresponding zone of memory addresses included in the N total zones −1 . . . −N. In one illustrative example, a second suspended tasklet can correspond to a set of "zone −2" memory addresses (not shown), which are higher than (e.g., above) the set of memory addresses corresponding to the zone −1 memory addresses 307.

In some embodiments, the "zone 0" memory addresses 309 can optionally be implemented, based on, for example, a particular option utilized for the preservation of allocated but unused memory addresses associated with a tasklet at the time of the tasklet being suspended/preempted. For example, in a first memory preservation approach for preempted (e.g., suspended) tasklets, allocated but unused memory addresses associated with a tasklet at the time of preemption are not preserved. Such an approach may be referred to as minimal preservation, wherein the preempting tasklet is allocated memory addresses beginning from the first unused memory address previously allocated to the preempted tasklet. In some examples, the "zone 1" memory addresses 301 and the "zone 2" memory addresses 302 can be included in a stack space of the currently running tasklet. For example, during execution of the running tasklet, stack growth and/or stack shrinking can result in one or more (or both) of the zone 1 and zone 2 memory addresses being reshaped.

In some embodiments, a second memory preservation approach for preempted tasklets can be implemented, such that allocated but unused memory addresses associated with a tasklet at the time of preemption are preserved. For instance, in some examples, allocated but unused memory addresses associated with a tasklet at the time of preemption can be preserved as the "zone 0" memory addresses 309. Such an approach may be referred to as maximal preservation. In maximal preservation, the preempting tasklet is allocated memory addresses beginning from the first unused memory address that is not already allocated to the preempted tasklet. In some aspects, when the "zone 0" memory address 309 exist (e.g., in the maximal preservation approach), the preempted tasklet is associated with both the "zone −1" memory addresses 307 (e.g., the portion of allocated memory addresses that were used by the tasklet at the time of preemption) and the "zone 0" memory addresses 309 (e.g., the remaining portion of allocated memory addresses, which do not contain valid data but were allocated to the preempted tasklet).

The "zone 1" memory addresses 301 can correspond to a currently running tasklet (e.g., the tasklet currently in the RUNNING state 217 of FIG. 2), and may contain valid data only or may contain a combination of valid data and memory address space for the currently running tasklet to grow into. In this example, the memory addresses (and memory address zones) that are located beyond the "zone 1" memory addresses 301 in the direction of stack growth (e.g., which in the example of FIGS. 3A-B is downward, to lower memory addresses) can be memory addresses that do not yet contain valid data for a running or suspended (preempted) tasklet. For instance, the "zone 2" memory addresses 302, the "zone 3" memory addresses 303, etc., may be allocated but unused memory addresses for growth of the stack space for the currently running tasklet associated with the zone 1 memory addresses 301 or they may be unallocated and unused memory addresses. As illustrated in FIGS. 3A and 3B, only suspended tasklets (e.g., PREEMPTED state tasklets) and running tasklets (e.g., RUNNING state tasklets) are associated with a stack starting address (e.g., the stack starting addresses 326 and 322, respectively), because memory and/or resource allocation is only performed for tasklets in the RUNNING or PREEMPTED states and not for tasklets in the READY or PENDING states.

Figure 5:
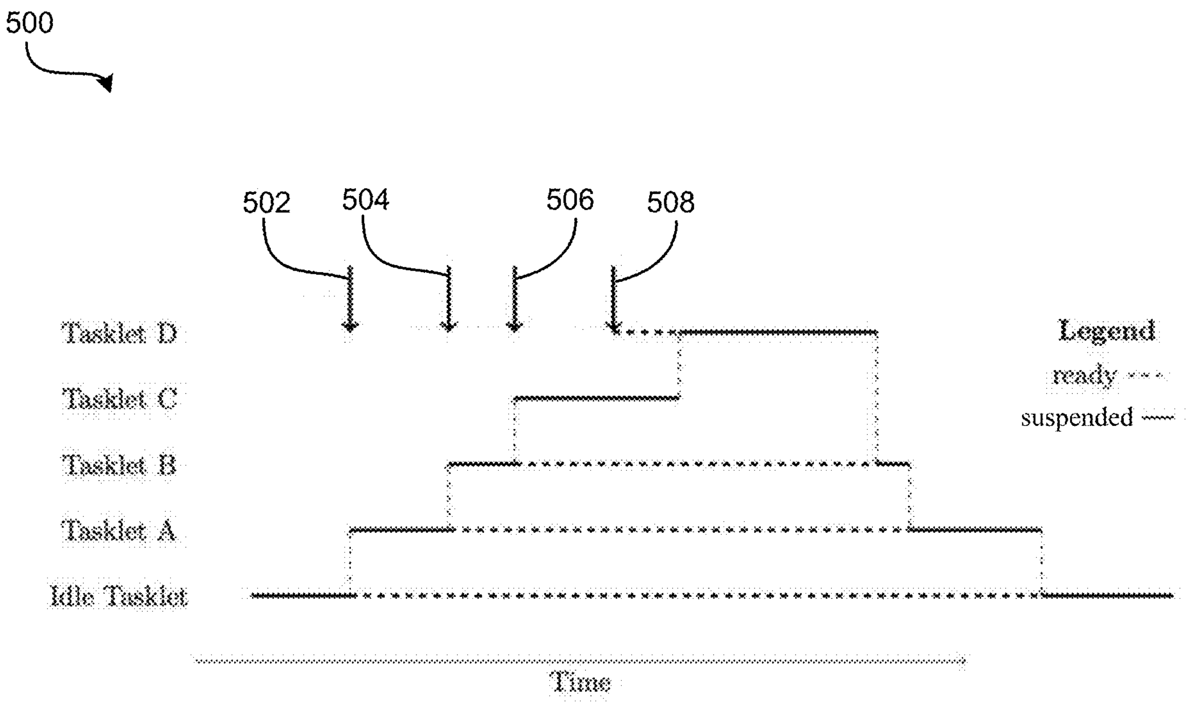
FIG. 5 depicts an example timing diagram of tasklets corresponding to events, according to some examples.

FIG. 5 depicts an example timing diagram 500 of tasklets corresponding to events, according to some examples, and further illustrates an example of the timing behavior of the preemptible tasklets contemplated and described herein. For instance, consider four user-defined tasklets, Tasklets A-D. Tasklet A has low priority, Tasklet B has medium priority, and Tasklets C and D have equally high priority. In some embodiments, the JCB contains a base pointer value that indicates the base of a stack frame for a tasklet in the RUNNING or PREEMPTED state. In some embodiments, the JCB has a stack pointer (SP) value that points to the current SP (e.g., for RUNNING jobs). For PREEMPTED jobs (e.g., suspended tasklets), the JCB can have an SP value that points to last SP used while the now-suspended/preempted tasklet was running (e.g., the last SP at the time of preemption).

Figure 7C:
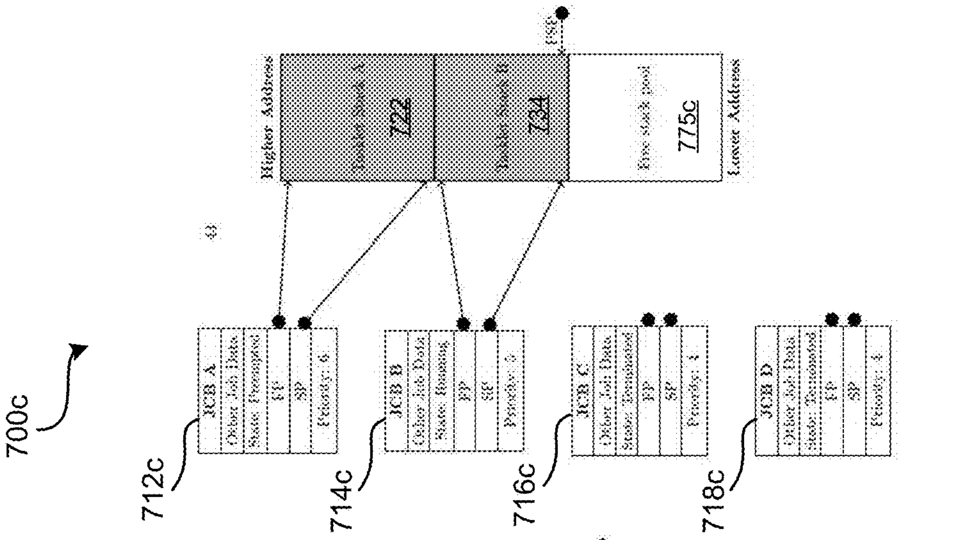
FIGS. 7A-7C are diagrams depicting respective snapshots of a stack pool on a hardware architecture where the stack pool grows downward and lower priority values are indicative of higher priority jobs, according to some examples.
Figure 7B:
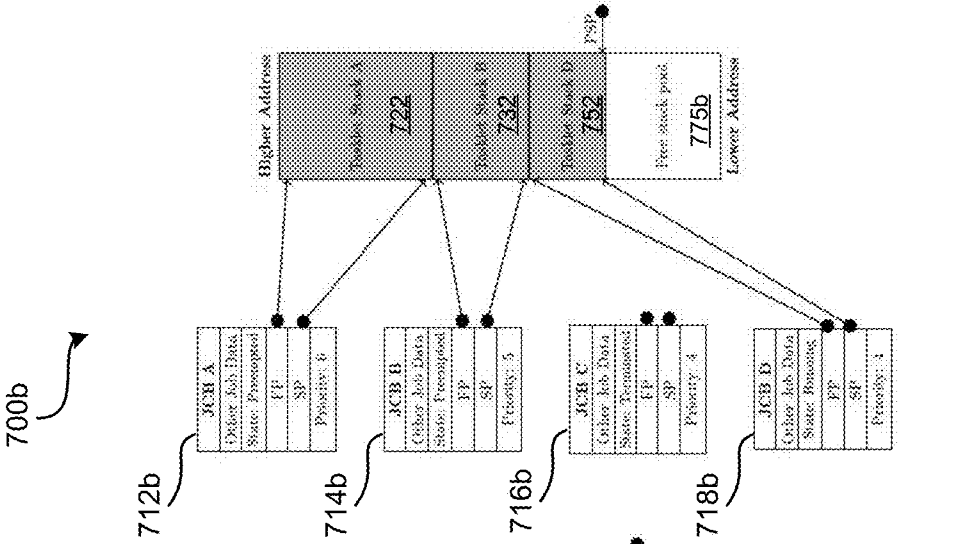
Figure 7A:
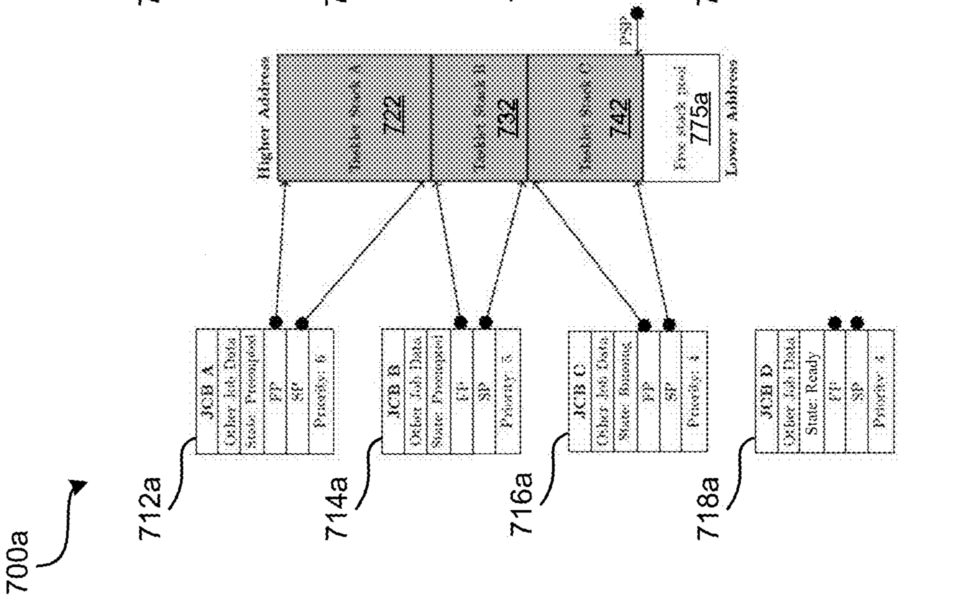

The disclosure makes reference next to FIGS. 7A-7C, which are diagrams depicting respective snapshots 700*a*-700*c* of a stack pool on a hardware architecture where the stack pool grows downward and lower priority values are indicative of higher priority jobs, according to some examples. In particular, it is contemplated that the value of the SP may increment and decrement as the tasklet uses its stack, for instance changing the SP register to the next highest priority tasklet. In the snapshot 700*a* depicted in FIG. 7A, a Tasklet A has been preempted by a Tasklet B which has been preempted by a Tasklet C. Tasklet A is associated with a tasklet stack A 722, Tasklet B is associated with a tasklet stack B 732, and Tasklet C is associated with a tasklet stack C 742. Tasklet A is further associated with a JCB A 712*a*, Tasklet B is further associated with a JCB B 714*a*, and Tasklet C is further associated with a JCB C 716*a*. Tasklet C is currently running (e.g., using the tasklet stack C memory address 742 of the stack pool) and using the PSP and/or free stack pool memory address 775*a* for scratch work as needed.

In the snapshot 700*b* depicted in FIG. 7B, suppose that a tasklet D becomes ready while Tasklet C is still in its running state. Since the priorities of Tasklet C and Tasklet D are identical (e.g., both having a priority value of 4, where lower priority values represent a higher prioritization), Tasklet D does not preempt Tasklet C, because an equal priority READY tasklet does not preempt an equal priority RUNNING tasklet, as described previously above.

However, after Tasklet C terminates (and as depicted in the particular example of FIG. 7B), the READY Tasklet D is selected to run next since Tasklet D has a high enough priority (lower value) compared to Tasklets A and B. In particular, Tasklet D has a greater prioritization (e.g., lower priority value) than either Tasklet A or Tasklet B. As illustrated in FIG. 7B, the JCB C 716*b* is updated to reflect "State: Terminated" for the now terminated Tasklet C. Tasklet D transitions from the READY state to the RUNNING state, using the tasklet D stack 752 (e.g., as indicated in the JCB D 718*b* indicating "State: Running" for the new preempting Tasklet D). Notably, tasklet D stack 752 begins from the same starting memory address as the tasklet C stack 742 shown in FIG. 7A. More particularly, both tasklet D stack 752 of FIG. 7B and tasklet C stack of FIG. 7A begin from the last memory address utilized by the Tasklet B in tasklet B stack 732, immediately prior to Tasklet B being preempted by Tasklet C (in FIG. 7A) and being preempted again by Tasklet D (in FIG. 7B).

After Tasklet D terminates (e.g., as reflected in the updated JCB D 718*c* depicted in snapshot 700*c* of FIG. 7C, "State: Terminated"), the next highest priority tasklet to run is tasklet B which was preempted in snapshot 700*a* of FIG. 7A by the higher prioritization Tasklet C, and preempted in snapshot 700*b* of FIG. 7B by the higher prioritization Tasklet D. To resume executing of Tasklet B (e.g., to transition Tasklet B from PREEMPTED to RUNNING), the corresponding portion/segment of memory addresses in the tasklet stack pool (e.g., tasklet stack B 732/734) is reclaimed by the kernel and Tasklet B may resume its execution as normal after being preempted. In particular, Tasklet B may resume its execution from the last memory address utilized by Tasklet B in the stack pool immediately prior to preemption (e.g., the last memory address included in Tasklet Stack B 732/734).

Returning now to the discussion of FIG. 5, suppose Tasklet A is conditioned on a particular semaphore. The semaphore is released in an interrupt service routine and acquired by Tasklet A causing it to become READY at time 502 (also referred to as first condition 502). Since the idle tasklet has the lowest priority in the system, Tasklet A preempts the idle tasklet based on the occurrence of the first condition at 502. Suppose Tasklet B is conditioned on another semaphore. That semaphore is then released and Tasklet B becomes the new highest priority job in the system at time 504 (also referred to as second condition 504), based on Tasklet B having a medium priority over Tasklet A's low priority.

As illustrated, Tasklet B is scheduled and runs briefly until a timer Tasklet C is conditioned on expires at time 506/condition 506, and Tasklet C becomes ready. Tasklet C has high priority and preempts the medium priority of Tasklet B. Notice that it is as if the stack pool is a "stack of stacks," with stacks belonging to higher priority jobs at the top of the stack (e.g., as in snapshot 700*a* of FIG. 7A). Another timer expires and Tasklet D also becomes ready, at time 508/condition 508. Because Tasklet D has equal high priority with Tasklet C, Tasklet D becoming ready at 508 does not preempt Tasklet C. Instead, Tasklet D is scheduled when Tasklet C terminates (e.g., as in snapshot 700*b* of FIG. 7B). After Tasklet D terminates, Tasklet B continues to run (e.g., based on being the highest priority tasklet in either the READY or PREEMPTED state). After Tasklet B terminates, Tasklet A continues to run, again based on being the highest priority tasklet in either the READY or PREEMPTED state (e.g., as in snapshot 700*c* of FIG. 7C). Finally Tasklet A terminates and the idle tasklet continues to run, based on no other tasklets being in the READY or PREEMPTED states (note that the idle tasklet may run while one or more conditional tasklets remain in the PENDING state, because a PENDING state conditional tasklet cannot run until exiting from PENDING to READY based on the fulfillment or occurrence of the one or more conditions associated with the conditional tasklet).

Described below are various examples of allocating stack memory to illustrate the improved memory footprint of preemptive tasklets that can be achieved using aspects of the present disclosure. For concreteness, consider an embedded developer (e.g., user) who plans to run 10 jobs on a resource-constrained system. Let $s_i$ be the stack size the user determined is needed to safely run job i, and let $p_i$ be the priority with which the RTOS user wishes job i to run. The user must ensure that tasklet i utilizes at most $s_i$ stack space and does not overflow its assigned stack. Suppose job 1 runs at a low priority and the other nine jobs run at an equal but higher priority than job 1: let $p_1=3$ and $p_2=2$ for all i=1.

In existing approaches, a lower priority value may be preferentially scheduled over a high priority value; higher priority jobs have lower priority values. In this example scenario, all jobs are independent and unsynchronized with each other and the conditional events that trigger a job to start running are external to the processor rather than conditioned on another job's completion. Consequently, job 1 is the only tasklet that may be preempted by a higher priority tasklet while the other nine tasklets have equal priority and will thus run to completion without being preempted once scheduled. The idle task and idle tasklet will be ignored in the respective cases.

Figure 4:
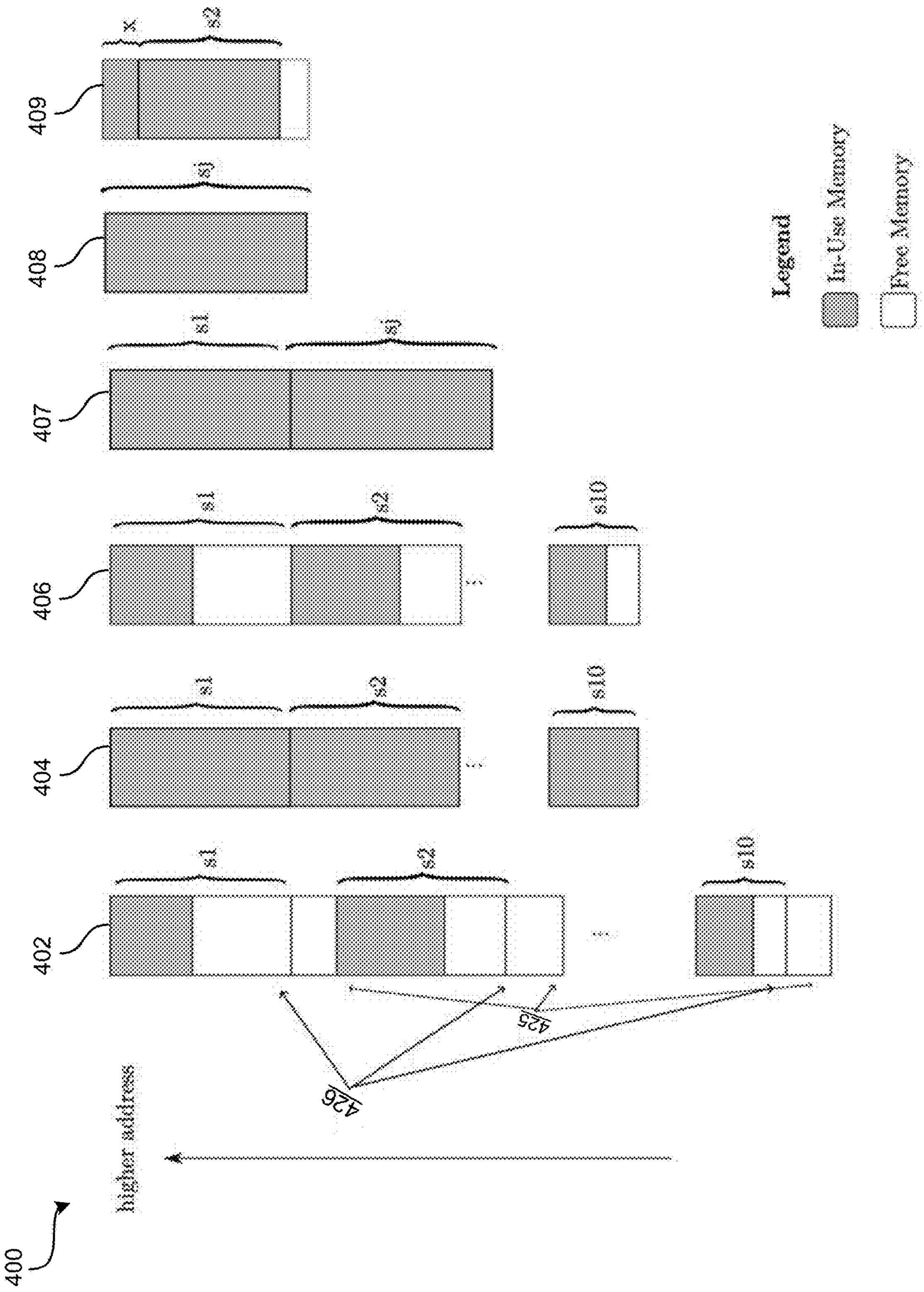
FIG. 4 is a diagram depicting memory layouts of various operating system (OS) implementations for allocating stacks, according to some examples.

FIG. 4 is a diagram 400 depicting memory layouts of various operating system (OS) implementations for allocating stacks, according to some examples. Recall that in a conventional preemptive RTOS, a stack for each task is allocated when the task is first created and persists until the task terminates; regardless of a task's scheduling state, the system must reserve for the task a constant stack space throughout its lifecycle. Thus, a conventional preemptive RTOS can experience significant overhead from free blocks of memory interspersed by assigned blocks of memory (e.g., shown generally in FIG. 4 at 425), from underutilization of the memory within an assigned block (e.g., shown generally in FIG. 4 at 426), or a combination of the two. The total memory used to reserve stacks is $$\sum_{i=1}^{10} s_i,$$

but the total memory needed is greater than $$\sum_{i=1}^{10} s_i$$

due to the presence of free blocks of memory interspersed by assigned blocks of memory, for instance as can be seen in the example memory layout 402.

Each task has its own unique stack to account for the worst-case stack utilization scenario. This occurs when job 1 runs until it reaches the limit of its stack and in that instant is preempted by a higher priority job. The RTOS may be running a time-slicing scheduling technique that coincidentally schedules another equal priority job to run exactly when the task reaches the limit of its stack, for instance as can be seen in the example memory layout 404.

Even with static stack allocation for each task, underutilization of the memory within an assigned block may still potentially occur. From the perspective of the system, memory required for stack allocation is the same regardless of how much stack memory the tasks actually use at a given instance (e.g., for instance, as can be seen in the example memory layout 406).

In another example, let job j be the job that the user determined has the greatest worst-case stack usage, excluding job 1: $s_j = \max\{s_i | I \in \mathbb{N}, 2 \le I \le 10\}$.

From the system's perspective, the worst-case stack memory usage with preemptible tasklets is only $s_1 + s_j$, with the memory footprint needed for stacks reduced by $$\sum_{i=1}^{10} s_i - s_j$$

(e.g., as can be seen in memory layout 407). This worst case stack memory usage can occur when job 1 was previously running and using its maximum allotted amount of stack space at the instant job 1 was preempted by job j. Then job j also reaches its maximum allotted stack space. At this point, no more stack space will be used by job j itself, and job j is tied for the highest priority tasklet, so no additional tasklet will preempt job/and consume additional stack space The best case stack memory usage using only preemptible tasklets is zero. This can occur when no job is running, so the system has not assigned any stack space to a job.

In at least some examples, the systems and techniques described herein can still safely schedule all jobs with a stack pool as small as $s_j$, for instance as depicted in memory layout 408. In this illustrative example, tasklets may run sequentially where one tasklet runs to completion and terminates before another tasklet is scheduled. The example memory layout 408 may be similar to conventional tasklets running using a work queue.

However, with enough stack space, then in some cases preemption can still occur with negligible memory overhead compared to traditional tasklets. For instance, consider example memory layout 409, and suppose tasklet 1 is executing and using x stack space where $x + s_2 < s_j$. In this example, tasklet 2 can then safely preempt tasklet 1 because enough memory remains in the stack pool to safely run tasklet 2 without overflowing the overall stack pool. Note that $s_1 + s_2$ can be greater than $s_j$ but it is still possible for tasklet 2 to preempt tasklet 1, as can also be seen in example memory layout 409 of FIG. 4.

In some embodiments, low priority tasks are configured to leave enough space remaining in the stack pool for a higher priority tasklet to preempt. If this restriction cannot be satisfied when the tasklet is ready, the lower priority tasklet will not be scheduled. In further embodiments, tasklets can be scheduled whenever there is enough memory for the tasklet stack itself. In such examples, if a high priority tasklet arrives later, the high priority tasklet will wait until sufficient stack space is available in the stack pool for the high priority tasklet to run.

In existing allocation schemes, a job control block (JCB) for a task is allocated adjacent to the stack. For instance, the OS makes a memory allocation for a block of memory addresses that is equal to at least the sum of the sizes of the JCB and stack. In the presently disclosed memory allocation scheme, the JCBs can be stored together and the task space is truly contiguous. Moving JCBs to allow for task stacks to be contiguous can be implemented according to various approaches and/or techniques known in the art.

The average case of preemptible tasklets may use far less memory. In particular, it is contemplated that not all tasklets in the system will be in the RUNNING or PREEMPTED state, and accordingly, not all tasklets will have a correspond stack allocated to the tasklet (e.g., because a stack is not allocated for tasklets that are not in either the RUNNING or PREEMPTED state). Furthermore, among the tasklets that do occupy stack memory (e.g., RUNNING and PREEMPTED tasklets), it is unlikely that these tasklets will consume the entire stack that would be available to them, making it probable that there is some quantity of leftover (e.g., remaining/free) stack memory.

This behavior can be utilized to enable further memory reductions to support functionality. In some examples, the worst-case stack usage of a conventional RTOS is also the minimum stack space needed for a conventional RTOS to run reliably. However, the presently disclosed systems and techniques can still make basic guarantees that all tasklets eventually terminate even if only max (A-Z) stack memory is available. A conventional RTOS would need sum (A-Z) stack memory to make the same guarantees. This is because in the extreme case, each tasklet implemented according to aspects of the present disclosure runs sequentially unless there is enough remaining stack memory to accommodate the worst-case stack usage of the new tasklet. As such, when a tasklet is scheduled, it only needs enough remaining stack space in that moment.

The size of the stack pool provides the OS user with much greater flexibility over how much they wish to balance real-time performance and memory consumption. The systems and techniques described herein are at least as memory efficient at both extremes without compromising real-time response. For instance, given the same amount of memory as a conventional RTOS, the presently disclosed systems and techniques will (at least on average) use less memory than the conventional RTOS. If given minimal memory, the presently disclosed systems and techniques perform better than preemptible tasklets with some instances of preemption. Providing more memory enables real-time performance of certain jobs and high memory efficiency of other jobs.

Aside from the stack, each job also utilizes a memory buffer for the corresponding job control block (JCB). While a job uses the stack as scratch space to store temporary data and call subroutines, a JCB stores the job's metadata. Examples of metadata can include, but are not limited to, handler function, scheduling state, priority, and/or a pointer to the job's stack, etc. A job's context may also be temporarily stored within the JCB. A JCB can occupy memory as soon as the corresponding job is created, and may continue to occupy memory until the corresponding job is deleted (e.g., terminated, etc.).

In a conventional RTOS using dynamic allocation, the JCB is allocated adjacent to the task's stack when the task is created. Using static allocation, the developer specifies a block of memory to use as the JCB. In some embodiments of the present disclosure, job JCBs can be allocated from a JCB memory pool rather than from the system heap. In one illustrative example, the JCB for a corresponding job can be allocated from a JCB memory pool that includes a fixed quantity of JCB memory blocks. With a linked list of blocks that points to the next block, allocating a JCB for a job can be performed in constant time without memory underutilization (e.g., allocating more memory than is used or needed, and/or blocks of free memory becoming interspersed by blocks of allocated memory). The size of the JCB memory pool can be configured depending on the number of jobs the system must service during program execution.

In some embodiments, the systems and techniques described herein can be implemented using a kernel that runs in the foreground as part of the "PendSV" interrupt. PendSV is commonly used for embedded RTOS system calls by convention, but other interrupts can also be utilized without departing from the scope of the present disclosure.

Described below is an example of a mechanism that can be used to implement tasklets on architectures featuring banked stack pointers (SPs) and/or banked SP registers. Although particular reference is made to examples utilizing banked SP registers comprising a process stack pointer (PSP) and a main stack pointer (MSP), it is noted that this example is not intended to be construed as limiting, and it is expressly contemplated that the systems and techniques described herein may additionally, or alternatively, be implemented using banked SP registers other than a PSP and MSP.

In some examples (e.g., such as example implementations based on ARMR® Cortex®-M architectures), there are two banked stack pointer registers. One is called the process stack pointer (PSP) and the other called the main stack pointer (MSP). MSP is always used in the foreground context, and either MSP or PSP can be used in the background context. However, it is again noted that the MSP and PSP are described for purposes of example, and the systems and techniques described herein can be utilized with various banked SP registers, either in addition to the MSP and PSP, or instead of the MSP and PSP.

The saved context comprises the program status register, the link register, and certain general purpose registers, but other general-purpose registers are not saved. In some examples, the MSP can also be referred to as the kernel stack pointer (KSP) (e.g., because conventional embedded RTOS system calls often run in the foreground, whereas scheduled jobs run in the background). In the particular example of banked SP registers that comprise a PSP and MSP, the processor runs in background context using PSP, but when entering an interrupt service routine, the hardware uses MSP to save the background's context before running an interrupt service routine. MSP and PSP uses different parts of the memory space for the stack. Thus, some architectures effectively support two run-time stacks, a kernel stack and a process stack. Consequently, a job using PSP in the foreground has its context saved elsewhere rather than directly on top of the job stack.

FIG. 6 is a diagram 600 depicting an example implementation of a tasklet context switch where a preempting tasklet stack frame is adjacent to a most recent stack pointer, according to some examples. As noted above, a hardware architecture that features banked stack pointers has at least two registers that can be used as the value of the stack pointer. The processor state determines which particular banked register is used as the SP and implicitly modified by PUSH and POP instructions.

As used herein, the term "stack frame" can be used to refer to the job level stack frame (e.g., instead of the subroutine-level stack frame). Other subroutines could be called which would generate their own stack frames, but the stack frames are depicted without showing further subroutine calls, for purposes of simplicity and clarity in illustrating subroutine calls at the tasklet level of abstraction.

To illustrate the procedure of context switching between preempted and preempting tasklets on hardware architectures that feature banked stack pointers (SPs), consider the case where Tasklet A is running and is preempted by high-priority Tasklet B. According to aspects of the present disclosure, the kernel handles the context switching procedure from Tasklet A to Tasklet B. Recall that in general a context switch comprises of saving the current context to be restored later and loading the new context.

As illustrated in the example of FIG. 6, at a time $t_1$ (e.g., corresponding to snapshot 610*a* of the kernel stack and snapshot 610*b* of the process stack), Tasklet A executes as a normal routine. The processor is in a state that uses PSP, and Tasklet A has its own stack 605. Note however that the stack memory Tasklet A uses at time $t_1$ is not necessarily the entire stack space the tasklet requested. For instance, if Tasklet B has its condition satisfied and becomes the highest priority READY job, then the systems and techniques will perform a context switch to Tasklet B. Whenever kernel logic detects that a context switch is necessary, the PendSV interrupt can be triggered. In architectures featuring banked stack pointers (SPs), in the example of banked SPs comprising at least a PSP and an MSP, the processor can switch from using PSP to using MSP, where PUSH and POP instructions will modify MSP rather than PSP. The architecture automatically saves some background context to the kernel stack using MSP, for instance in, the ISR-saved context 606 depicted in snapshot 620*a* of the kernel stack at time $t_2$. Subsequently, the PendSV logic begins to execute and may use additional stack space (e.g., the "PendSV Stack" space 608 depicted in FIG. 6) if other subroutines or local variables are used from the PendSV handler subroutine.

At time $t_2$, the processor is executing the instructions of the PendSV handler subroutine. Certain machine instructions within PendSV can copy the context saved by the interrupt entry mechanism (e.g., the ISR-saved context 606) to tasklet A's JCB. The exact sequence of hardware registers saved onto the stack by the interrupt mechanism may be hardware dependent, in which case the exact machine code used to copy the interrupt-saved context to a JCB can vary. Subsequently, the PendSV handler stores the remaining registers to the JCB. These registers generally comprise of subroutine callee-saved registers because the caller-saved registers are manipulated by the interrupt entry mechanism.

At time $t_3$ (e.g., corresponding to the kernel stack snapshot 630*a* and the process stack snapshot 630*b*), PendSV has overwritten part of the kernel stack 630*a* with tasklet B's context 607 and loaded the remaining registers to the processor hardware. Some parts of the context switch are not reentrant, so other interrupts may need to be temporarily disabled for a period while the context switch is performed. The previous PSP is saved to tasklet B's JCB to record the location of the stack's base. PendSV also initializes tasklet B's stack frame 609 (e.g., shown within the process stack snapshot 630*b*) with the prologue of tasklet B's subroutine. The function prologue is initialized to return to a tasklet cleanup function. In some aspects, this is performed without using PUSH or POP instructions (e.g., because MSP is the current stack pointer being used).

At time $t_4$ (e.g., corresponding to kernel stack snapshot 640*a* and process stack snapshot 640*b*), the ISR signals it has finished to the processor, and the hardware performs a return-from-interrupt procedure. Tasklet B's caller-saved context is popped from the kernel stack into the respective hardware registers. The processor state switches back to using PSP.

At time $t_5$ (e.g., corresponding to kernel stack snapshot 650*a* and process stack snapshot 650*b*), the processor is now in the context of tasklet B. The subroutine associated with Tasklet B uses its stack 655 as if it had been called from another background subroutine context instead of a special foreground context (e.g., as if it had been called from a subroutine that will call thread_exit after returning). Tasklet B may become preempted, but its context will still be preserved accordingly and it will not be able to notice it was preempted after regaining control (apart from checking volatile flags).

Notably, this context switch effectively borrows stack space that Tasklet A could have used. In the likely event Tasklet B grows its stack (e.g., by declaring local variables or calling subroutines), Tasklet B will use the same memory addresses that could have been used by Tasklet A. However, the borrowed memory used by Tasklet B is returned to the stack pool before Tasklet A executes again (e.g., where Tasklet A resumes execution after Tasklet B has run to completion).

When a tasklet is created, the callback function is wrapped between two API calls: a tasklet entry function and a tasklet exit function. The tasklet entry function initializes the context for the tasklet and allocates a region for the tasklet stack from the tasklet stack pool. The exit function cleans up the tasklet and frees the tasklet stack that was allocated upon initialization. In some embodiments, freeing the tasklet stack can be achieved by overwriting the value of MSP with the stack base value stored in the tasklet's JCB.

When the tasklet terminates, a return from the job handler will cause an invocation of kernel service to terminate current tasklet, the invoked kernel service will destroy the current tasklet's context and then either resume a previously preempted thread context, or loading a new job with highest priority in a new created thread context. The tasklet cleanup function triggers invoking a system call. The original frame pointer reclaims all the memory that the tasklet had used for its general purpose stack (e.g., for call frames, function calls, scratch space). All data on the stack past the frame pointer is known to be part of the tasklet, so it can all be freed once the tasklet terminates. The kernel sets the process stack pointer to the frame pointer, which is saved in the tasklet's job control block. Moving the value of the frame pointer to the PSP frees all the tasklet stack memory allocated to the terminated tasklet. This is performed in addition to normal cleanup functions for an RTOS. The scheduler then selects the next job to run, switching the context to the next job.

In existing approaches, shrinking a stack before first growing the stack with push operations corresponds to undefined behavior, thereby leading to the conventional assumption that well-designed tasklets will not shrink the stack and corrupt the preempted tasklet's data. Consequently, a preempted tasklet will not corrupt the stack. When the preempting tasklet terminates, the stack space is returned to the system. When the preempted tasklet eventually resumes execution, it continues to use the entire stack space originally allocated to it.

In one illustrative example, according to aspects of the present disclosure, the kernel places a restriction upon the system such that once a tasklet becomes preempted by another tasklet (e.g., when a currently running tasklet becomes a suspended tasklet/transitions to the PREEMPTED state), the preempted tasklet may not run until the preempting tasklet terminates. This restriction is due to the preempting tasklet using stack space directly adjacent the most recent stack pointer of the preempted tasklet (e.g., where the most recent stack pointer of the preempted tasklet is the stack pointer of the preempted tasklet immediately prior to preemption). For instance, if the preempted tasklet were to run before the preempting tasklet terminates, the preempted tasklet may corrupt the preempting tasklet's stack. However, the existence of prioritized jobs implies that the user always wishes the highest priority job to run at a given moment.

In some embodiments, a job has metadata that is maintained by the system. Most job metadata is stored within the JCB, as mentioned previously above. For instance, the JCB can include information indicative of some (or all) of the seven example variables discussed below. In one illustrative example, some (or all) of the following seven variables are known when a job is initialized: handler_function, handler_function_parameter, priority, stack, stack_size, stack_type, and condition, stack_type and condition are parameters introduced according to the systems and techniques described herein, handler_function is a function pointer to a function written by the embedded application developer that the OS may later schedule and execute, handler_function is executed with handler_function parameter passed as an argument. The priority field is an integer-type value indicating the job's scheduling priority. The stack_size field is an integer-type value that indicates the size of the stack the system should allocate for the job to run.

A job can be characterized as a static job, persistent job, or temporary job depending on the lifetime of the job. In conventional RTOS implementations, static tasks and dynamic tasks may be analogous to static jobs and persistent jobs, respectively. A job with a temporary stack arrangement is introduced according to aspects of the present disclosure. Notably, a job with the temporary stack_type will be treated as a preemptible tasklet by the systems and techniques described herein. In some examples, while tasklets may be preferable for performance reasons, tasks and tasklets can still be run within the same system to remain compatible with legacy applications and/or applications designed for task-based operating systems.

The sixth variable is the conditional event. In some cases, metadata relating to the conditional event may not be included in the JCB. For instance, if the conditional event is the acquirement of a semaphore or mutex, the job may be in a list requesting access to the semaphore. For deferred jobs that are waiting for a timer to expire, there may be a list of jobs ordered by the expiration times of their respective timers.

A job may need additional metadata to be compatible with more advanced hardware configurations. In existing approaches, a context may be with a memory protection unit; when context switching to a tasklet, the kernel can configure a system state with the MPU where only the region of the stack pool allocated to that tasklet can be accessed.

According to aspects of the present disclosure, the kernel can handle the usage of an MPU by allowing access only the region of the stack pool allocated to the running tasklet. If a distinction between privileged and unprivileged modes is desired, the kernel may use the MPU to restrict the access of the job it schedules next, restricting it to only its respective region of the tasklet stack pool. Thus, certain safety and security concerns remain addressable with preemptible tasklets.

Core affinity for hardware targets featuring symmetric multi-processing (SMP) may require additional configuration and metadata. Some hardware setups may feature multiple processors where one instance of the presently disclosed kernel is responsible for scheduling jobs on multiple processors. In some embodiments, each processor core configured to run tasklets has its own stack pool. Additional job metadata may be needed to indicate whether a job has no preference, a preference, or a requirement to be executed on a particular core. In some aspects, creating a tasklet can be deterministic since a heap is not used. Memory allocation for the stack and JCB succeeds and fails in constant time.

Figure 8:
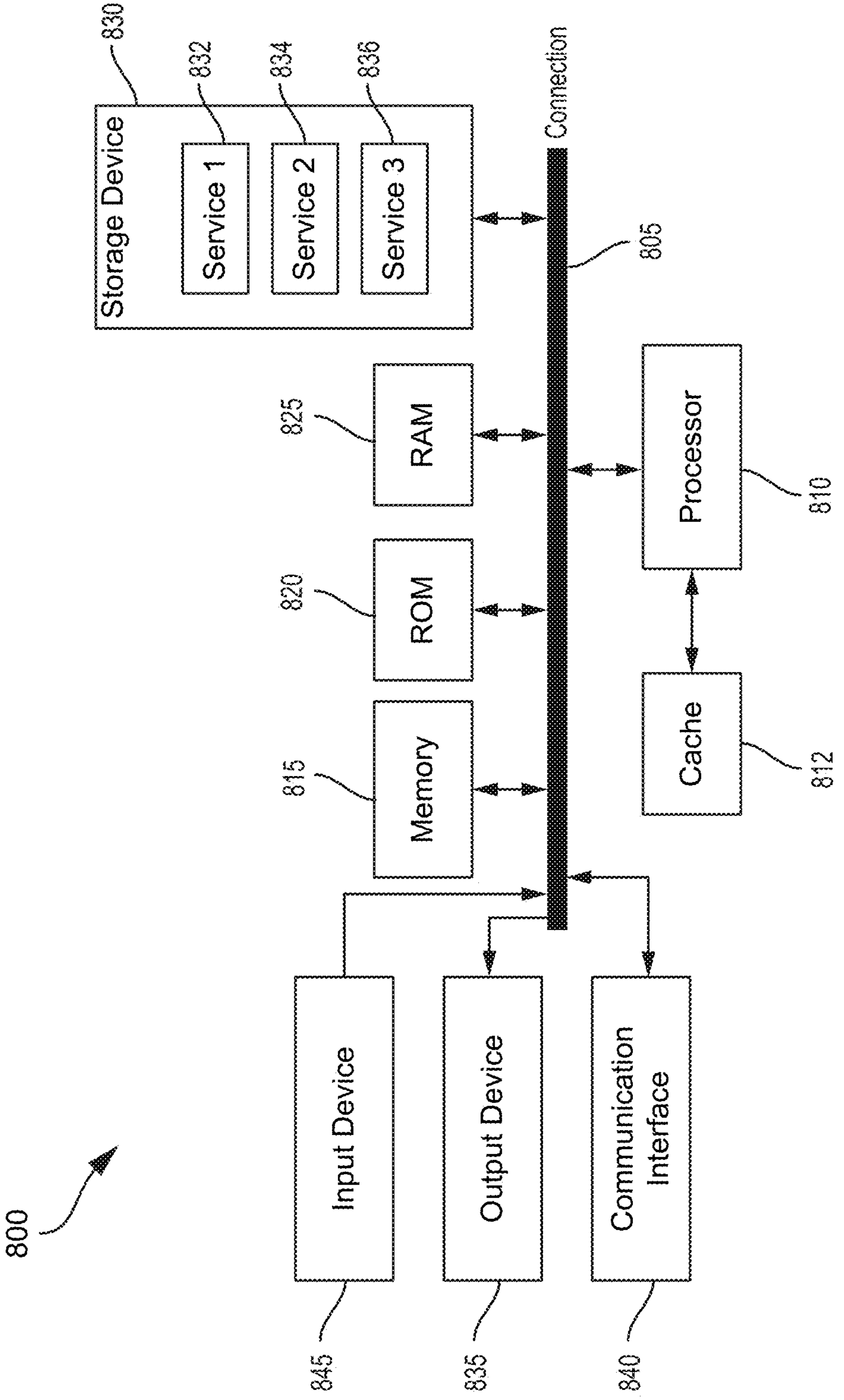
FIG. 8 is a block diagram illustrating an example of a computing system, which may be employed by the disclosed systems and techniques, in accordance with some examples.

FIG. 8 is a block diagram illustrating an example of a computing system 800, which may be employed by the disclosed systems and techniques. In particular, FIG. 8 illustrates an example of computing system 800, which can be, for example, any computing device making up internal computing system, a remote computing system, a camera, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some aspects, computing system 800 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 800 includes at least one processing unit (CPU or processor) 810 and connection 805 that communicatively couples various system components including system memory 815, such as read-only memory (ROM) 820 and random-access memory (RAM) 825 to processor 810. Computing system 800 can include a cache 812 of high-speed memory connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms. In some instances, multimodal systems can enable a user to provide multiple types of input/output to communicate with computing system 800.

Computing system 800 can include communications interface 840, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 840 may also include one or more range sensors (e.g., LIDAR sensors, laser range finders, RF radars, ultrasonic sensors, and infrared (IR) sensors) configured to collect data and provide measurements to processor 810, whereby processor 810 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick R card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some aspects, a hardware service that performs a particular function can include the software component stored in a computer-readable medium in connection with the necessary hardware components, such as processor 810, connection 805, output device 835, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Illustrative aspects of the disclosure include:

Aspect 1. A method comprising: constructing a first run-time stack for a first tasklet of a plurality of tasklets, wherein the first run-time stack is allocated a contiguous block of memory between a starting memory address and an ending memory address in a stack pool; executing the first tasklet using at least a first portion of the contiguous block of memory from the starting memory address up to an intermediate memory address; based on determining the first tasklet is preempted by a second tasklet of the plurality of tasklets, constructing a second run-time stack in the stack pool for the second tasklet, wherein the second run-time stack is allocated a second starting memory address after the intermediate memory address and before the ending memory address of the first run-time stack; executing the second tasklet using at least a second portion of the contiguous block of memory, wherein the second portion begins from the second starting memory address and is non-overlapping with the first portion; freeing a set of memory addresses associated with the second run-time stack after the second tasklet terminates; and resuming execution of the first tasklet, wherein the first tasklet resumes execution using memory addresses previously associated with the first run-time stack prior to being preempted.

Aspect 2. The method of Aspect 1, wherein: the first tasklet resumes execution beginning from a memory address previously used as the second starting memory address for executing the second tasklet.

Aspect 3. The method of Aspect 1, wherein: the intermediate memory address associated with executing the first tasklet prior to being preempted and the second starting memory address associated with executing the second tasklet are consecutive memory addresses in the stack pool.

Aspect 4. The method of Aspect 1, wherein: the intermediate memory address associated with executing the first tasklet comprises a most recent memory address utilized by the first tasklet prior to the first tasklet being preempted by the second tasklet.

Aspect 5. The method of Aspect 1, wherein one or more of the first tasklet or the second tasklet executes in the background.

Aspect 6. The method of Aspect 1, further comprising constructing, in the stack pool, a plurality of run-time stacks corresponding to an equal quantity of tasklets, the quantity based on a size of the stack pool, wherein: each respective tasklet of the plurality of tasklets is preempted by another tasklet of the plurality of tasklets, until an ending memory address of a potential next tasklet would exceed a boundary of the stack pool; or each respective tasklet of the plurality of tasklets is preempted by another tasklet of the plurality of tasklets until there are no other tasklets available to preempt a currently executing tasklet.

Aspect 7. The method of Aspect 6, further comprising performing prioritized tasklet scheduling based on a corresponding priority associated with each tasklet of the plurality of tasklets, wherein: a third tasklet of the plurality of tasklets is scheduled based on being ready and having a highest corresponding priority; and a fourth tasklet of the plurality of tasklets preempts execution of the third tasklet based on the fourth tasklet being ready and having a greater corresponding priority than the third tasklet.

Aspect 8. The method of Aspect 7, wherein prioritized tasklet scheduling is performed based on a preemption list, the preemption list indicative of the corresponding priority associated with each tasklet of the plurality of tasklets.

Aspect 9. The method of Aspect 7, further comprising: elevating the corresponding priority of a respective tasklet that is preempted by one or more additional tasklets, wherein the respective tasklet has its corresponding priority elevated from a first priority to a second priority that is greater than the corresponding priority of each of the one or more additional tasklets.

Aspect 10. The method of Aspect 9, wherein: one or more preempted tasklets with a corresponding priority between the first priority and the second priority undertake the second priority and a currently running tasklet within the stack pool undertakes the second priority; the currently running tasklet and the one or more preempted tasklets run to completion; and memory is freed from the stack pool until the respective tasklet with the elevated priority can be scheduled.

Aspect 11. The method of Aspect 6, wherein: the plurality of tasklets includes one or more conditional tasklets each conditioned on at least one event; and the at least one event comprises one or more of acquirement of a semaphore, acquirement of a mutual exclusion lock, or expiration of a timer.

Aspect 12. The method of Aspect 11, wherein the at least one event comprises one or more of: multiple instances of acquirement of a semaphore; multiple instances of acquirement of a mutual exclusion lock; multiple instances of expiration of a timer; or an empty event.

Aspect 13. The method of Aspect 12, further comprising implementing a soft timer subsystem based on the empty event.

Aspect 14. The method of Aspect 6, wherein the stack pool comprises a contiguous block of memory.

Aspect 15. The method of Aspect 14, wherein the contiguous block of memory comprises a plurality of physically consecutive hardware memory addresses.

Aspect 16. The method of Aspect 14, wherein the contiguous block of memory comprises a plurality of consecutive virtual memory addresses.

Aspect 17. The method of Aspect 6, further comprising performing tasklet preemption based on at least one tasklet preemption data structure indicative of an order in which tasklets became preempted, wherein: an identifier of a tasklet that is preempted is added to a top of the tasklet preemption data structure; and an identifier of a tasklet that resumes execution after being preempted is removed from the tasklet preemption data structure.

Aspect 18. The method of Aspect 17 wherein the tasklet preemption data structure is implemented as a linked list.

Aspect 19. The method of Aspect 6, wherein: one or more tasks run concurrently in a same scheduling system as the plurality of tasklets; and a respective priority associated with each tasklet of the plurality of tasklets is determined relative to a respective priority associated with each remaining tasklet of the plurality of tasklets and each task of the one or more tasks.

Aspect 20. The method of Aspect 19, wherein: the plurality of tasklets is encapsulated within a particular task of the one or more tasks; and a priority associated with the particular task is equal to a highest priority ready tasklet encapsulated within the particular task.

Aspect 21. The method of Aspect 19, wherein: a tasklet may preempt a task having a lower priority than the preempting tasklet; and a task may preempt a tasklet with a lower priority than the preempting task.

Aspect 22. The method of Aspect 6, wherein each tasklet of the plurality of tasklets is associated with a corresponding job control block (JCB), wherein the JCB is constructed in deterministic time from a JCB pool.

Aspect 23. The method of Aspect 1, further comprising: constructing, in the stack pool, a first set of run-time stacks corresponding to a first subset of the plurality of tasklets; and constructing, in a second stack pool different from the stack pool, a second set of run-time stacks corresponding to a second subset of the plurality of tasklets.

Aspect 24. The method of Aspect 23, wherein each respective tasklet of the plurality of tasklets is assigned to run in either one of the stack pool and the second stack pool.

Aspect 25. The method of Aspect 24, wherein a particular tasklet of the plurality of tasklets is assigned to run in the stack pool or the second stack pool based on one or more of: a user input; availability information determined for the stack pool; or availability information determined for the second stack pool.

Aspect 26. The method of Aspect 23, wherein the first set of run-time stacks are allocated to fill the stack pool prior to allocating the second set of run-time stacks in the second stack pool.

Aspect 27. The method of Aspect 6, further comprising: determining a context associated with a particular tasklet of the plurality of tasklets; and based on the context, managing memory access for the particular tasklet using a memory protection unit.

Aspect 28. The method of Aspect 27, wherein managing memory access for the particular tasklet using the memory protection unit comprises: preventing the particular tasklet from accessing the stack pool outside of the starting and ending memory addresses of a corresponding run-time stack of the particular tasklet.

Aspect 29. The method of Aspect 27, wherein: the memory protection unit is configured to provide the particular tasklet with memory access to a limited portion of a total memory pool; and the limited portion of the total memory pool is determined based on the context associated with the particular tasklet.

Aspect 30. The method of Aspect 1, wherein run-time stack construction and tasklet scheduling is performed by an operating system (OS), an OS kernel, or a scheduler.

Aspect 31. The method of Aspect 30, wherein the OS is a real-time operating system (RTOS).

Aspect 32. An apparatus for preemptible tasklet scheduling, the apparatus comprising: a memory; and one or more processors coupled to the memory, the one or more processors configured to: construct a first run-time stack for a first tasklet of a plurality of tasklets, wherein the first run-time stack is allocated contiguous block of memory between a starting memory address and an ending memory address in a stack pool; execute the first tasklet using at least a first portion of the contiguous block of memory from the starting memory address up to an intermediate memory address; construct, based on determining the first tasklet is preempted by a second tasklet of the plurality of tasklets, a second run-time stack in the stack pool for the second tasklet, wherein the second run-time stack is allocated a second starting memory address after the intermediate memory address and before the ending memory address of the first run-time stack; execute the second tasklet using at least a second portion of the contiguous block of memory, wherein the second portion begins from the second starting memory address and is non-overlapping with the first portion; free a set of memory addresses associated with the second run-time stack after the second tasklet terminates; and resume execution of the first tasklet, wherein the first tasklet resumes execution using memory addresses previously associated with the first run-time stack prior to being preempted.

Aspect 33. The apparatus of Aspect 32, wherein the one or more processors are configured to: resume execution of the first tasklet beginning from a memory address previously used as the second starting memory address for executing the second tasklet.

Aspect 34. The apparatus of Aspect 32, wherein: the intermediate memory address associated with executing the first tasklet prior to being preempted and the second starting memory address associated with executing the second tasklet are consecutive memory addresses in the stack pool.

Aspect 35. The apparatus of Aspect 32, wherein: the intermediate memory address associated with executing the first tasklet comprises a most recent memory address utilized by the first tasklet prior to the first tasklet being preempted by the second tasklet.

Aspect 36. The apparatus of Aspect 32, wherein the one or more processors are configured to: execute one or more of the first tasklet or the second tasklet in the background.

Aspect 37. The apparatus of Aspect 32, wherein the one or more processors are further configured to construct, in the stack pool, a plurality of run-time stacks corresponding to an equal quantity of tasklets, the quantity based on a size of the stack pool, wherein: each respective tasklet of the plurality of tasklets is preempted by another tasklet of the plurality of tasklets, until an ending memory address of a potential next tasklet would exceed a boundary of the stack pool; or each respective tasklet of the plurality of tasklets is preempted by another tasklet of the plurality of tasklets until there are no other tasklets available to preempt a currently executing tasklet.

Aspect 38. The apparatus of Aspect 37, wherein the one or more processors are further configured to perform prioritized tasklet scheduling based on a corresponding priority associated with each tasklet of the plurality of tasklets, wherein: a third tasklet of the plurality of tasklets is scheduled based on being ready and having a highest corresponding priority; and a fourth tasklet of the plurality of tasklets preempts execution of the third tasklet based on the fourth tasklet being ready and having a greater corresponding priority than the third tasklet.

Aspect 39. The apparatus of Aspect 38, wherein the one or more processors are configured to: perform prioritized tasklet scheduling based on a preemption list, the preemption list indicative of the corresponding priority associated with each tasklet of the plurality of tasklets.

Aspect 40. The apparatus of Aspect 38, wherein the one or more processors are further configured to: elevate the corresponding priority of a respective tasklet that is preempted by one or more additional tasklets, wherein the respective tasklet has its corresponding priority elevated from a first priority to a second priority that is greater than the corresponding priority of each of the one or more additional tasklets.

Aspect 41. The apparatus of Aspect 40, wherein: one or more preempted tasklets with a corresponding priority between the first priority and the second priority undertake the second priority and a currently running tasklet within the stack pool undertakes the second priority;

the currently running tasklet and the one or more preempted tasklets run to completion; and memory is freed from the stack pool until the respective tasklet with the elevated priority can be scheduled.

Aspect 42. The apparatus of Aspect 37, wherein: the plurality of tasklets includes one or more conditional tasklets each conditioned on at least one event; and the at least one event comprises one or more of acquirement of a semaphore, acquirement of a mutual exclusion lock, or expiration of a timer.

Aspect 43. The apparatus of Aspect 42, wherein the at least one event comprises one or more of: multiple instances of acquirement of a semaphore; multiple instances of acquirement of a mutual exclusion lock; multiple instances of expiration of a timer; or an empty event.

Aspect 44. The apparatus of Aspect 43, wherein the one or more processors are further configured to implement a soft timer subsystem based on the empty event.

Aspect 45. The apparatus of Aspect 37, wherein the stack pool comprises a contiguous block of memory.

Aspect 46. The apparatus of Aspect 45, wherein the contiguous block of memory comprises a plurality of physically consecutive hardware memory addresses.

Aspect 47. The apparatus of Aspect 45, wherein the contiguous block of memory comprises a plurality of consecutive virtual memory addresses.

Aspect 48. The apparatus of Aspect 37, wherein the one or more processors are further configured to perform tasklet preemption based on at least one tasklet preemption data structure indicative of an order in which tasklets became preempted, wherein: an identifier of a tasklet that is preempted is added to a top of the tasklet preemption data structure; and an identifier of a tasklet that resumes execution after being preempted is removed from the tasklet preemption data structure.

Aspect 49. The apparatus of Aspect 48 wherein the one or more processors are configured to implement the tasklet preemption data structure as a linked list.

Aspect 50. The apparatus of Aspect 37, wherein the one or more processors are configured to: run one or more tasks concurrently in a same scheduling system as the plurality of tasklets; and determine a respective priority associated with each tasklet of the plurality of tasklets relative to a respective priority associated with each remaining tasklet of the plurality of tasklets and each task of the one or more tasks.

Aspect 51. The apparatus of Aspect 50, wherein the one or more processors are configured to: encapsulate the plurality of tasklets within a particular task of the one or more tasks; and set a priority associated with the particular task as equal to a highest priority ready tasklet encapsulated within the particular task.

Aspect 52. The apparatus of Aspect 50, wherein: a tasklet may preempt a task having a lower priority than the preempting tasklet; and a task may preempt a tasklet with a lower priority than the preempting task.

Aspect 53. The apparatus of Aspect 37, wherein each tasklet of the plurality of tasklets is associated with a corresponding job control block (JCB), wherein the JCB is constructed in deterministic time from a JCB pool.

Aspect 54. The apparatus of Aspect 32, wherein the one or more processors are further configured to: construct, in the stack pool, a first set of run-time stacks corresponding to a first subset of the plurality of tasklets; and construct, in a second stack pool different from the stack pool, a second set of run-time stacks corresponding to a second subset of the plurality of tasklets.

Aspect 55. The apparatus of Aspect 54, wherein the one or more processors are configured to assign each respective tasklet of the plurality of tasklets to run in either one of the stack pool and the second stack pool.

Aspect 56. The apparatus of Aspect 55, wherein the one or more processors are configured to assign a particular tasklet of the plurality of tasklets to run in the stack pool or the second stack pool based on one or more of: a user input; availability information determined for the stack pool; or availability information determined for the second stack pool.

Aspect 57. The apparatus of Aspect 54, wherein the one or more processors are configured to allocate the first set of run-time stacks to fill the stack pool prior to allocating the second set of run-time stacks in the second stack pool.

Aspect 58. The apparatus of Aspect 37, wherein the one or more processors are further configured to: determine a context associated with a particular tasklet of the plurality of tasklets; and based on the context, manage memory access for the particular tasklet using a memory protection unit.

Aspect 59. The apparatus of Aspect 58, wherein, to manage memory access for the particular tasklet using the memory protection unit, the one or more processors are configured to: prevent the particular tasklet from accessing the stack pool outside of the starting and ending memory addresses of a corresponding run-time stack of the particular tasklet.

Aspect 60. The apparatus of Aspect 58, wherein: the memory protection unit is configured to provide the particular tasklet with memory access to a limited portion of a total memory pool; and the limited portion of the total memory pool is determined based on the context associated with the particular tasklet.

Aspect 61. The apparatus of Aspect 32, wherein the one or more processors are configured to perform run-time stack construction and tasklet scheduling is using an operating system (OS), an OS kernel, or a scheduler.

Aspect 62. The apparatus of Aspect 61, wherein the OS is a real-time operating system (RTOS).

Aspect 63. A non-transitory computer-readable storage medium comprising instructions stored thereon which, when executed by at least one processor, causes the at least one processor to perform operations according to any of Aspects 1 to 31.

Aspect 64. A non-transitory computer-readable storage medium comprising instructions stored thereon which, when executed by at least one processor, causes the at least one processor to perform operations according to any of Aspects 32 to 62.

Aspect 65. An apparatus comprising one or more means for performing operations according to any of Aspects 1 to 31.

Aspect 66. An apparatus comprising one or more means for performing operations according to any of Aspects 32 to 62.

What is claimed is:

1. A method comprising:

constructing a first run-time stack for a first tasklet of a plurality of tasklets, wherein the first run-time stack is allocated a contiguous block of memory between a starting memory address and an ending memory address in a stack pool;

executing the first tasklet using at least a first portion of the contiguous block of memory from the starting memory address up to an intermediate memory address;

based on determining the first tasklet is preempted by a second tasklet of the plurality of tasklets, constructing a second run-time stack in the stack pool for the second tasklet, wherein the second run-time stack is allocated a second starting memory address after the intermediate memory address and before the ending memory address of the first run-time stack;

executing the second tasklet using at least a second portion of the contiguous block of memory, wherein the second portion begins from the second starting memory address and is non-overlapping with the first portion;

freeing a set of memory addresses associated with the second run-time stack after the second tasklet terminates; and resuming execution of the first tasklet, wherein the first tasklet resumes execution using memory addresses previously associated with the first run-time stack prior to being preempted.

2. The method of claim 1, wherein:

the first tasklet resumes execution beginning from a memory address previously used as the second starting memory address for executing the second tasklet.

3. The method of claim 1, wherein:

the intermediate memory address associated with executing the first tasklet prior to being preempted and the second starting memory address associated with executing the second tasklet are consecutive memory addresses in the stack pool.

4. The method of claim 1, wherein:

the intermediate memory address associated with executing the first tasklet comprises a most recent memory address utilized by the first tasklet prior to the first tasklet being preempted by the second tasklet.

5. The method of claim 1, wherein one or more of the first tasklet or the second tasklet executes in the background.

6. The method of claim 1, further comprising constructing, in the stack pool, a plurality of run-time stacks corresponding to an equal quantity of tasklets, the quantity based on a size of the stack pool, wherein:

each respective tasklet of the plurality of tasklets is preempted by another tasklet of the plurality of tasklets, until an ending memory address of a potential next tasklet would exceed a boundary of the stack pool; or each respective tasklet of the plurality of tasklets is preempted by another tasklet of the plurality of tasklets until there are no other tasklets available to preempt a currently executing tasklet.

7. The method of claim 6, further comprising performing prioritized tasklet scheduling based on a corresponding priority associated with each tasklet of the plurality of tasklets, wherein:

a third tasklet of the plurality of tasklets is scheduled based on being ready and having a highest corresponding priority; and a fourth tasklet of the plurality of tasklets preempts execution of the third tasklet based on the fourth tasklet being ready and having a greater corresponding priority than the third tasklet.

8. The method of claim 7, wherein prioritized tasklet scheduling is performed based on a preemption list, the preemption list indicative of the corresponding priority associated with each tasklet of the plurality of tasklets.

9. The method of claim 7, further comprising:

elevating the corresponding priority of a respective tasklet that is preempted by one or more additional tasklets, wherein the respective tasklet has its corresponding priority elevated from a first priority to a second priority that is greater than the corresponding priority of each of the one or more additional tasklets.

10. The method of claim 9, wherein:

one or more preempted tasklets with a corresponding priority between the first priority and the second priority undertake the second priority and a currently running tasklet within the stack pool undertakes the second priority;

the currently running tasklet and the one or more preempted tasklets run to completion; and memory is freed from the stack pool until the respective tasklet with the elevated priority can be scheduled.

11. The method of claim 6, wherein:

the plurality of tasklets includes one or more conditional tasklets each conditioned on at least one event; and the at least one event comprises one or more of acquirement of a semaphore, acquirement of a mutual exclusion lock, or expiration of a timer.

12. The method of claim 11, wherein the at least one event comprises one or more of:

multiple instances of acquirement of a semaphore;

multiple instances of acquirement of a mutual exclusion lock;

multiple instances of expiration of a timer; or an empty event.

13. The method of claim 12, further comprising implementing a soft timer subsystem based on the empty event.

14. The method of claim 6, wherein the stack pool comprises a contiguous block of memory.

15. The method of claim 14, wherein the contiguous block of memory comprises a plurality of physically consecutive hardware memory addresses.

16. The method of claim 14, wherein the contiguous block of memory comprises a plurality of consecutive virtual memory addresses.

17. The method of claim 6, further comprising performing tasklet preemption based on at least one tasklet preemption data structure indicative of an order in which tasklets became preempted, wherein:

an identifier of a tasklet that is preempted is added to a top of the tasklet preemption data structure; and an identifier of a tasklet that resumes execution after being preempted is removed from the tasklet preemption data structure.

18. The method of claim 17 wherein the tasklet preemption data structure is implemented as a linked list.

19. The method of claim 6, wherein:

one or more tasks run concurrently in a same scheduling system as the plurality of tasklets; and a respective priority associated with each tasklet of the plurality of tasklets is determined relative to a respective priority associated with each remaining tasklet of the plurality of tasklets and each task of the one or more tasks.

20. The method of claim 19, wherein:

the plurality of tasklets is encapsulated within a particular task of the one or more tasks; and a priority associated with the particular task is equal to a highest priority ready tasklet encapsulated within the particular task.

* * * * *